(12) United States Patent
Laleg-Kirati et al.

(10) Patent No.: US 10,013,607 B2
(45) Date of Patent: Jul. 3, 2018

(54) SYSTEM AND METHOD FOR IMAGE RECONSTRUCTION, ANALYSIS, AND/OR DE-NOISING

(71) Applicant: KING ABDULLAH UNIVERSITY OF SCIENCE AND TECHNOLOGY, Thuwal (SA)

(72) Inventors: Taous-Meriem Laleg-Kirati, Thuwal (SA); Zineb Kaisserli, Thuwal (SA)

(73) Assignee: KING ABDULLAH UNIVERSITY OF SCIENCE AND TECHNOLOGY, Thuwal (SA)

( * ) Notice: Subject to any disclaimer, the term of this patent is extended or adjusted under 35 U.S.C. 154(b) by 72 days.

(21) Appl. No.: 15/306,484

(22) PCT Filed: Apr. 24, 2015

(86) PCT No.: PCT/IB2015/001447
§ 371 (c)(1),
(2) Date: Oct. 24, 2016

(87) PCT Pub. No.: WO2015/170192
PCT Pub. Date: Nov. 12, 2015

(65) Prior Publication Data
US 2017/0046557 A1    Feb. 16, 2017

Related U.S. Application Data

(60) Provisional application No. 61/984,719, filed on Apr. 25, 2014, provisional application No. 62/103,385, filed on Jan. 14, 2015.

(51) Int. Cl.
*G06K 9/00* (2006.01)
*G06T 5/00* (2006.01)
(Continued)

(52) U.S. Cl.
CPC ......... *G06K 9/0053* (2013.01); *G06K 9/6214* (2013.01); *G06T 5/002* (2013.01);
(Continued)

(58) Field of Classification Search
USPC ........ 382/100, 103, 106, 128–132, 154–264, 382/274–276, 286, 305, 312, 321;
(Continued)

(56) References Cited

U.S. PATENT DOCUMENTS

| | | | |
|---|---|---|---|
| 7,272,265 B2 * | 9/2007 | Kouri ................. | G06K 9/00516 382/260 |
| 2004/0071363 A1 * | 4/2004 | Kouri ................. | G06K 9/00516 382/276 |

(Continued)

OTHER PUBLICATIONS

Notification Concerning Transmittal of International Preliminary Report on Patentability (Chapter I of The Patent Cooperation Treaty) dated Nov. 3, 2016, issued in International Application No. PCT/IB2015/001447.

(Continued)

*Primary Examiner* — Seyed Azarian
(74) *Attorney, Agent, or Firm* — Patent Portfolio Builders PLLC

(57) ABSTRACT

A method and system can analyze, reconstruct, and/or denoise an image. The method and system can include interpreting a signal as a potential of a Schrödinger operator, decomposing the signal into squared eigenfunctions, reducing a design parameter of the Schrödinger operator, analyzing discrete spectra of the Schrödinger operator and combining the analysis of the discrete spectra to construct the image.

7 Claims, 10 Drawing Sheets

(51) Int. Cl.
*G06K 9/62* (2006.01)
*G06T 7/00* (2017.01)
*G01N 31/00* (2006.01)

(52) U.S. Cl.
CPC ...... *G06T 7/00* (2013.01); *G06T 2207/10016* (2013.01); *G06T 2207/10081* (2013.01); *G06T 2207/10088* (2013.01); *G06T 2207/20012* (2013.01); *G06T 2207/20036* (2013.01); *G06T 2207/30101* (2013.01); *G06T 2207/30164* (2013.01)

(58) Field of Classification Search
USPC ............................ 707/737; 1/1; 702/23, 32
See application file for complete search history.

(56) References Cited

U.S. PATENT DOCUMENTS

| | | | |
|---|---|---|---|
| 2004/0128081 A1* | 7/2004 | Rabitz | G01N 21/636 702/23 |
| 2015/0046457 A1* | 2/2015 | Weinstein | G06K 9/622 707/737 |
| 2016/0225146 A1* | 8/2016 | Frank | A61B 5/055 |

OTHER PUBLICATIONS

International Preliminary Report on Patentability (Chapter I of the Patent Cooperation Treaty) dated Oct. 25, 2016, issued in International Application No. PCT/IB2015/001447.

International Search Report dated Oct. 30, 2015, issued in International Application No. PCT/IB2015/001447.

Written Opinion of the International Searching Authority dated Oct. 30, 2015, issued in International Application No. PCT/IB2015/001447.

Zineb Kaisserli et al: "Semi-classical based image reconstruction", 6th Colloquium on Trends in the Applications in Tunisia, Algeria, Morocco, 2013, Apr. 6, 2013 (Apr. 6, 2013), XP055223062, Retrieved from the Internet: URL:http://hal.inria.fr/hal-00795302v2/document [retrieved on Oct. 22, 2015] the whole document.

Da-Yan Liu et al: "Mathematical properties of a semi-classical signal analysis method: Noisy signal case", Systems and Computer Science 9ICSCS), 2012 1st International Conference on, IEEE, Aug. 29, 2012 (Aug. 29, 2012), pp. 1-6, XP032376736, DOI: 10.1109/ICONSCS.2012.6502462 ISNB: 978-1-4673-0673-7 the whole document.

\* cited by examiner (a) (b)

(a) (b) (c)

SYSTEM AND METHOD FOR IMAGE RECONSTRUCTION, ANALYSIS, AND/OR DE-NOISING

PRIORITY CLAIM

This application claims the benefit under 35 USC 371 to International Application No. PCT/IB2015/001447, filed Apr. 24, 2015, which claims priority to U.S. Provisional Application No. 61/984,719, filed Apr. 25, 2014 and U.S. Provisional Application No. 62/103,385, filed Jan. 14, 2015, which are each incorporated by reference in their entireties.

TECHNICAL FIELD

The present invention relates to a system and method for reconstructing an image, for example, based on the semi-classical analysis of the Schrödinger operator.

BACKGROUND

The need for efficient image reconstruction and interpretation is still a challenge in many fields. In spite of methods and algorithms that have been proposed, there is a need to improve the performance. Among the existing methods are the standard 2D Fourier transform, the Wavelet with its different modified versions or the total variations based approach. More recently, methods based on partial differential equations have been proposed. Many other algorithms have been proposed, each method having its advantages and limitations.

A signal can be decomposed using a family of functions, which can be given by squared eigenfunctions associated to the discrete spectrum of a semi-classical Schrödinger operator where the signal can be considered as a potential of such operator. This decomposition can be applied to one-dimensional signals such as arterial blood pressure signals or machinery performance signals.

SUMMARY

The present invention is generally directed to a system and method for analyzing or approximating or denoising an image and/or denoising a signal. An aspect can include interpreting the signal as a potential of a Schrödinger operator, decomposing the signal into squared eigenfunctions, reducing a design parameter of the Schrödinger operator, analyzing discrete spectra of the Schrödinger operator and combining, e.g. for an image, the analysis of the discrete spectra to construct the image. The signal and/or image can contain at least a first component associated with a first set of functions and a second component associated with a second set of functions. Decomposing the signal and/or image can include separating it into first squared eigenfunctions associated with the first set of functions from second squared eigenfunctions associated with the second set of functions.

In some embodiments, reducing the design parameter of the Schrödinger operator can include reducing the Plank constant. In some embodiments, reducing the design parameter can further include optimizing the $\lambda$ and $\gamma$ parameters.

In other embodiments, the signal can be a video signal. In other embodiments, the two-dimensional image can be a magnetic resonance image and/or a tomographic image.

Another aspect can include approximating an image, including decomposing data containing the image into squared eigenfunctions of a Schrödinger operator, analyzing discrete spectra of the squared eigenfunctions, optimizing a design parameter of the Schrödinger operator, and constructing an approximation of the image based on the analysis of the discrete spectra.

In some embodiments, analyzing the discrete spectra can exclude noise in the data. In other embodiments, the squared eigenfunctions can be adaptive. Analyzing can include a morphological analysis.

Yet another aspect can include a system for denoising a signal. The system can include a computer processor and a non-transitory computer readable medium. The non-transitory computer readable medium can contain instructions directing the system to execute steps, including interpreting the signal as a potential of a Schrödinger operator, decomposing the signal, reducing a design parameter of the Schrödinger operator, analyzing discrete spectra of the Schrödinger operator, combining the analysis to reconstruct a denoised signal. The signal can contain at least a first component associated with a first set of functions and a second component associated with a second set of functions. Decomposing the signal can include separating the into first squared eigenfunctions associated with the first set of functions from second squared eigenfunctions associated with the second set of functions. In some embodiments, the signal can contain information of a two-dimensional image. In other embodiments, the two-dimensional image can be a magnetic resonance image. The two-dimensional image can be a tomographic image.

DESCRIPTION OF THE DRAWINGS

The present invention is further described in the detailed description which follows, in reference to the noted plurality of drawings by way of non-limiting examples of certain embodiments of the present invention, in which like numerals represent like elements throughout the several views of the drawings, and wherein.

DETAILED DESCRIPTION OF EXEMPLARY EMBODIMENTS

Figure 1:
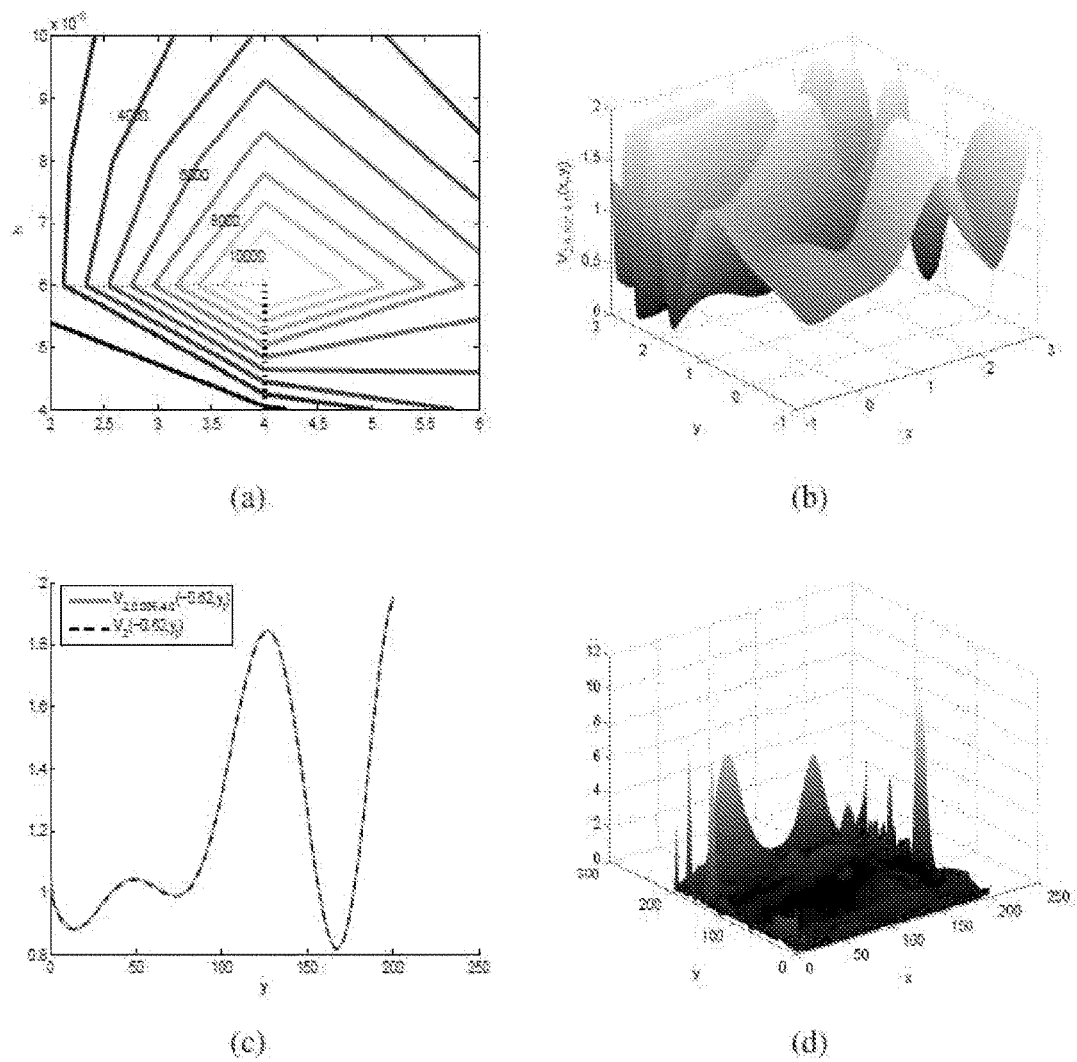
FIG. 1 depicts various influences that design parameters can have on a potential of a Schrödinger operator.

A detailed explanation of the system and method according to exemplary embodiments of the present invention are described below. Exemplary embodiments described, shown, and/or disclosed herein are not intended to limit the claims, but rather, are intended to instruct one of ordinary skill in the art as to various aspects of the invention. Other embodiments can be practiced and/or implemented without departing from the scope and spirit of the claimed invention.

Image representation and denoising is an important operation in many applications such as biomedical and seismic fields. New image representation and denoising methods utilizing, e.g., squared eigenfunction and/or discrete spectra of the Schrödinger operator for digital signal processing. One idea of such approaches can be to decompose an image using a set of localized functions. Such functions can be given by L2-normalized eigenfunctions associated with a discrete spectrum of the two-dimensional (2D) semi-classical Schrödinger operator, whose potential is given by the image of interest. To reduce the complexity of the eigenvalues and eigenfunction computation of the 2D operator, the proposed algorithm splits the 2D operator into one-dimensional (1D) operators. The tensor product of the squared L2-normalized eigenfunctions of the 1D operators can then be used to decompose the image. This algorithm can also permit increasing the degree of parallelism at the implementation level, which can bring further parallel performance. The inner computational kernels generally turn out to be dense linear algebra operations, i.e., dot products and matrix-vector multiplications, as well as symmetric eigensolvers. This algorithm can also permit exposure of more concurrency, which can be exploited by the OpenMP programming model for parallel performance.

Present systems and methods are generally directed to approximating and/or reconstructing images via semi-classical signal analysis. As discussed above, a signal can be decomposed using a family of functions which can be given by squared eigenfunctions associated to the discrete spectrum of a semi-classical Schrödinger operator where the signal can be considered as a potential of such operator. A discrete spectrum of negative eigenvalues and $L^2$-normalized eigenfunctions can be used to reconstruct and analyze the signal with, in part, semi-classical signal analysis (SCSA). In addition to localization properties of the $L^2$-normalized eigenfunctions and pertinent information they can contain, SCSA can yield beneficial results by, for example, applying an SCSA method to analysis of arterial blood pressure signals and to the analysis of the performance of turbomachinery. Moreover, SCSA can help cope with noisy signals, e.g. as a tool for denoising. Filtering properties of SCSA can be useful in, for example, in-vivo experiments where magnetic resonance spectroscopy data are used, e.g., to assess lipid content.

SCSA can be extended to, for example, approximating images. The image can be represented using spatially shifted and/or localized functions that are given by the squared eigenfunctions of the Schrödinger operator associated with the negative eigenvalues. This approximation can become exact when the semi-classical parameter h converges to zero. While the number of eigenfunctions increases when h decreases, through numerical it can be seen that a relatively small number of eigenfunctions (large enough h) can be enough to reconstruct the image which makes this method beneficial for image processing applications, such as coding.

The extension of SCSA can be useful for image representation and denoising in multiple dimensions, e.g. two and three dimensions. One approach can include using separation of variables when analyzing the squared eigenfunctions of a two dimensional semi-classical Schrödinger operator. The image can be considered as a potential of this operator. The problem then can be solved through, e.g. spectral analysis for one dimensional Schrödinger operators and then combining the results for the reconstruction of images with an appropriate formula from semi-classical analysis theory. This formula can be expressed as a tensor product of the squared $L^2$-normalized eigenfunctions in the x direction and the squared $L^2$-normalized eigenfunctions in the y direction. One-dimensional transforms for two-dimensional reconstruction can be used in image processing, an example being a two-dimensional Fourier transform. As in the one dimensional case, the convergence of this formula when the semi-classical parameter converges to zero.

SCSA can be generalized to two dimensions. As discussed further herein, the convergence of the analysis can be shown when the semi-classical parameter converges to zero. An algorithm in two-dimensions and the numerical analysis of the effect of different parameters in SCSA is further discussed herein, as well as numerical results illustrating the efficiency of an exemplary method for image reconstruction.

First discussed is SCSA for the one dimensional case. Consider the following Schrödinger operator:

$$H_{1,h}(V_1) = -h^2 \frac{d^2}{dx^2} - V_1 \qquad (1)$$

where $h \in \mathbb{R}_+^*$ is the semi-classical parameter, and $V_1$ is a positive real valued function belonging to $C^\infty(\Omega_1)$ where $\Omega_1 = ]a, b[ \subset \mathbb{R}$ is a bounded open set. Then, the potential $V_1$ can be approximated using the following proposition.

Proposition 2.1

Let $V_1 \in \mathbb{R}_+^* C^\infty(\Omega_1)$ be positive real valued function. Then, for any $\lambda_1$ such that $\lambda_1 \subset \Omega_1$ is compact, $V_1$ can be approximated using the following formula. $\forall x \in \lambda_1$:

$$V_{1,h,\gamma,\lambda}(x) = -\lambda + \left( \frac{h}{L_{1,\gamma}^{cl}} \sum_{n=1}^{N_h^\lambda} (\lambda - \lambda_{n,h})^\gamma \psi_{n,h}^2(x) \right)^{\frac{2}{1+2\gamma}}, \qquad (2)$$

where $h \in \mathbb{R}_+^*$, $\gamma \in \mathbb{R}_+$, $\lambda \in \mathbb{R}_-^*$, and $L_{1,\gamma}^{cl}$ is the suitable universal semi-classical constant given by:

$$L_{1,\gamma}^{cl} = \frac{1}{2\sqrt{\pi}} \frac{\Gamma(\gamma+1)}{\Gamma\left(\gamma+\frac{3}{2}\right)},$$

where $\Gamma$ is the gamma function.

Moreover, $\lambda_{n,h}$ are the negative eigenvalues of $H_{l,h}(V_1)$ with $$\lambda_{l,h} < \ldots < \lambda_{N_h^\lambda,h} < \lambda,$$

$N_h^\lambda$ is the number of negative eigenvalues smaller than $\lambda$, and $\psi_{n,h}$ are the associated $L^2$-normalized eigenfunctions such that: $H_{l,k}(V_1)\psi_{n,h} = \lambda_{n,h}\psi_{n,h}$.

The efficiency of the proposed signal estimation method and the influence of the parameters $\lambda$, $\gamma$ and h have been studied. In particular, the semi-classical parameter h can play a key role in this approach. When h decreases, the estimation can improve $V_{l,h,\gamma,\lambda}$. The Schrödinger operator in the case where h tends to 0 is referred to the semi-classical analysis, hence justification for the name semi-classical signal analysis given herein.

The formula given in (2) is still valid in the case where $\lambda=0$, and it can give results of interest even if $\lambda$ is out of the range of definition. For example, the following formula:

$$V_{1,h,\frac{1}{2},0}(x) = 4h \sum_{n=1}^{N_h^0} (-\lambda_{n,h})^{\frac{1}{2}} \psi_{n,h}^2(x) \qquad (3)$$

has been used for analysis of the arterial blood pressure signal, as well as analysis of the performance of turbo machines.

For some geometrical and topological reasons, in image processing it can be more practical to consider a separation of variables approach to extend the one-dimensional transforms to two-dimensional. This is the case for example with the two-dimensional Fourier transform which can be expressed using the product of the complex exponential in the x direction and in they direction. A separation of variable approach can allow the definition of simple formula and fast numerical algorithms. A similar generalization of the SCSA method can be kept for two dimensions.

Some heuristics can help in formulating a two-dimensional SCSA formula. Herein below, the following two-dimensional Schrödinger operator can be associated to a potential $V_2$:

$$H_{2,h}(V_2) = -h^2 \Delta - V_2 \qquad (4)$$

where $$\Delta = \frac{\partial^2}{\partial x^2} + \frac{\partial^2}{\partial y^2}$$

is the two-dimensional Laplacian operator, $h \in \mathbb{R}_+^*$ is the semi-classical parameter, and $V_2$ is a positive real valued function belonging to $C^\infty(\Omega_2)$, where $\Omega_2 \subset ]a,b[\times]c,d[$ is an open bounded set of $\mathbb{R}^2$.

As described above, a one dimensional implementation can use negative eigenvalues and associated eigenfunctions of the operator $H_{l,h}(V_1)$ given by Equation (1) to estimate the potential $V_1$. In order to estimate the potential $V_2$ by using a similar approach, on can focus on the following spectral problem:

$$H_{2,h}(V_2)\psi_{k,h} = \lambda_{k,h}^{x,y} \psi_{k,h} \qquad (5)$$

where $\lambda_{k,h}^{x,y}$ and $\psi_{k,h}$ for $k=1, \ldots, K_h^\lambda$, refer to the negative eigenvalues and the associated $L^2$-normalized eigenfunctions respectively.

The separation of variables can be used to calculate the eigenfunctions $\psi_{k,h}$. Hence, by taking $$\psi_{k,h}(x,y) = \varphi_{n,h}(x)\phi_{m,h}(y) \qquad (6)$$

in (5), for $n=1, \ldots, N_n^\lambda$ and $m=1, \ldots, M_n^\lambda$ with $K_n^\lambda = N_n^\lambda M_n^\lambda$. The following can be obtained: $\forall (x, y) \in \lambda_2$, $$-h^2 \Delta\{\varphi_{n,h}(x)\phi_{m,h}(y)\} - V_2(x,y)\varphi_{n,h}(x)\phi_{m,h}(y) = \lambda_{k,h}^{x,y} \varphi_{n,h}(x)\phi_{m,h}(y) \qquad (7)$$

which implies that, $\forall(x, y) \in \lambda_2$:

$$\left(-h^2 \frac{\partial^2}{\partial x^2}\varphi_{n,h}(x) - \frac{1}{2}V_2(x,y)\varphi_{n,h}(x)\right)\phi_{m,h}(y) + \qquad (8)$$

$$\left(-h^2 \frac{\partial^2}{\partial y^2}\phi_{m,h}(y) - \frac{1}{2}V_2(x,y)\phi_{m,h}(y)\right)\varphi_{n,h}(x) = \lambda_{k,h}^{x,y} \varphi_{n,h}(x)\phi_{m,h}(y)$$

Consider the following one dimensional spectral problems, $\forall(x, y) \in \lambda_2$, $$H_{l,h}^x(\tfrac{1}{2}V_2(\bullet,y))\varphi_{n,h}(x) = \lambda_{n,h}^x \varphi_{n,h}(x) \qquad (9)$$

$$H_{l,h}^y(\tfrac{1}{2}V_2(x,\bullet))\varphi_{n,h}(y) = \lambda_{m,h}^y \phi_{m,h}(y) \qquad (10)$$

where $\lambda_{n,h}^x (\text{resp.} \lambda_{m,h}^y)$ are the negative eigenvalues of the operator $H_{l,h}^y(\tfrac{1}{2}V_2(\bullet, y))(\text{resp.} H_{l,h}^y(\tfrac{1}{2}V_2(x,\bullet))$, $n=1, \ldots, N_k^\lambda$, (resp. $m=1, \ldots, M_k^\lambda$), and $\varphi_{n,h}(\text{resp.} \varphi_{m,h})$ are associated $L^2$-normalized eigenfunctions. Then, $\forall(x, y)$, by using (9) and (10) in (8), we get: $(\lambda_{n,h}^x + \lambda_{m,h}^y)\varphi_{n,h}(x)\varphi_{m,h}(y) = \lambda_{k,h}^{x,y}\varphi_{n,h}(x)\varphi_{m,h}(y)$. Consequently, we obtain the following relation:

$$\lambda_{n,h}^x + \lambda_{m,h}^y = \lambda_{k,h}^{x,y} \qquad (11)$$

for $m=1, N_h^\lambda$, $m=1, \ldots, M_h^\lambda$ and $k=1, \ldots, N_h^\lambda M_h^\lambda$.

The coefficient $$\frac{h}{L_{1,\gamma}^{cl}},$$

and the power $$\frac{1}{1+2\gamma}$$

given in Proposition 2.1 are related to some Riesz means connected to a Lieb-Thirring's conjecture and a suitable extension of Karadzhov's theorem on the spectral function. Referring to the n-dimensional formulation of the Riesz means and the spectral function of Karadzhov, the coefficient and the power of the sum in two dimensions can be found. In particular, it can be shown the power and the coefficient are given respectively by $$\frac{1}{1+\gamma} \text{ and } \frac{h^2}{L_{2,\gamma}^{cl}},$$

where the suitable universal semi-classical constant $L_{2,\gamma}^{cl}$ is given by $$L_{2,\gamma}^{cl} = \frac{1}{2^2\pi} \frac{\Gamma(\gamma+1)}{\Gamma(\gamma+2)} \qquad (12)$$

where $\Gamma$ is the gamma function.

Consequently, from the foregoing, the following proposition can be proposed.

Proposition 3.1

Let $V_2$ be a positive real valued function belonging to $C^\infty(\Omega_2)$. Then, for any $\lambda_2$ such that $\lambda_2 \subset \Omega_2$ is a compact, $V_2$ can approximated by the following formula in $\lambda_2$, $$V_{2,h,\gamma,\lambda}(x, y) = \tag{13}$$

$$-\lambda + \left(\frac{h^2}{L_{2,\gamma}^{cl}} \sum_{n=1}^{N_h^1} \sum_{m=1}^{M_h^2} (\lambda - (\lambda_{n,h}^x + \lambda_{m,h}^y))_+^\gamma \varphi_{n,h}^2(x) \phi_{m,h}^2(y)\right)^{\frac{1}{1+\gamma}}$$

where $h \in \mathbb{R}_+^x$, $\gamma \in \mathbb{R}_+$, $\lambda \in \mathbb{R}$, and $L_{2,\gamma}^{cl}$, known as the suitable universal semi-classical constant, is given by (12).

Moreover, $\lambda_{n,h}^x$ (resp. $\lambda_{m,h}^y$) are the negative eigenvalues of the operator $H_{l,h}^x(\frac{1}{2}V_2(\bullet, y))$ (resp. $H_{l,h}^y(\frac{1}{2}V_2(x, \bullet))$) with $\lambda_{l,h}^x < \ldots < \lambda_{N_h^\lambda,h}^x < \lambda$ (resp. $\lambda_{l,h}^y < \ldots < \lambda_{M_h^\lambda,h}^x < \lambda$), $M_h^\lambda$ (resp. $M_h^\lambda$) is the number of negative eigenvalues smaller than $\lambda$, and $\varphi_{n,h}$ (resp. $\varphi_{m,h}$) are the associated $L^2$-normalized eigenfunctions.

As in the one-dimensional case, the semi-classical parameter h can play an important role in a two-dimensional SCSA method. The convergence of formula (13) when the semi-classical parameter h converges to zero can be shown, for example by a generalization of known proofs.

Theorem 4.1

Let $V_2$ be a real valued $C^\infty$ function on a bounded open set $\Omega_2$ considered as potential of Schrödinger operator (4). Then, for any pair $\lambda_2$, $\Lambda$ such that $\lambda_2 \subset \Omega_2$ is compact and $$\begin{cases} \lambda < \inf(-V_2(a, c), -V_2(b, c)), \\ V_2(a, b, c, d) \subset ]-\lambda_2, \infty[, \\ \lambda \text{ is not a critical value of } -V_2 \end{cases} \tag{14}$$

and, uniformly for $(x, y) \in \lambda_2$, we have $$V_2(x, y) = \tag{15}$$

$$-\lambda + \lim_{h \to 0} \left(\frac{h^2}{L_{2,\gamma}^{cl}} \sum_{n=1}^{N_h^1} \sum_{m=1}^{M_h^2} (\lambda - (\lambda_{n,h}^x + \lambda_{m,h}^y))_+^\gamma \varphi_{n,h}^2(x) \phi_{m,h}^2(y)\right)^{\frac{1}{1+\gamma}}$$

where $\gamma \in \mathbb{R}_+^*$, and $L_{2,\gamma}^{cl}$ is the suitable universal semi-classical constant given by (12).

Moreover, $\lambda_{n,h}^x$, and $\varphi_{n,h}$ (resp. $\lambda_{m,h}^y$ and $\varphi_{m,h}$) denote the negative eigenvalues with $\lambda_{l,h}^x < \ldots < \lambda_{N_h^\lambda,h}^x < \lambda$ (resp. $\lambda_{l,h}^y < \ldots < \lambda_{M_h^\lambda,h}^x < \lambda$), $N_h^\lambda$ (resp. $M_h^\lambda$) is the number of the negative eigenvalues smaller than $\lambda$, and associated $L^2$-normalized eigenfunctions of the operator $H_{l,h}^x(\frac{1}{2}V_2(\bullet, y))$ (resp. $H_{l,h}^y(\frac{1}{2}V_2(x, \bullet))$).

The following results can be used to prove theorem 4.1. The next theorem is a generalization in two dimensions of Theorem 4.1 done by Helffer and Laleg which is a suitable extension of Karadzhov's theorem on the spectral function.

Theorem 4.2

Let $V_2$ be a real valued $C^\infty$ function considered as potential of the Schrödinger operator (4) on a bounded open set $]a,b[\times]c,d[$. Let $e_h^y$ known as spectral function, be defined by: $\forall((x, x'), (y, y')) \in (]a,b[\times]c,d[)^2$, $$e_h^\gamma(\lambda, x, y, x', y') = \tag{16}$$

$$\sum_{\lambda_{n,h}^x \leq \lambda} \sum_{\lambda_{n,h}^y \leq \lambda} (\lambda - (\lambda_{n,h}^x + \lambda_{m,h}^y))_+^\gamma \varphi_{n,h}(x) \varphi_{n,h}(x') \phi_{n,h}(y) \phi_{n,h}(y')$$

when $h \to 0$. $\lambda_{n,h}^x$, and $\phi_{n,h}$ (resp. $\lambda_{n,h}^x$ and $\phi_{n,h}$) refer to the decreasing negative eigenvalues less than $\lambda$, and associated $L^2$-normalized eigenfunctions of the operators $H_{l,h}^x(\frac{1}{2}V_2(\bullet, y))$ (resp. $H_{l,h}^y(\frac{1}{2}V_2(x, \bullet))$).

Then, for any pair $(\Omega_2, \lambda)$ satisfying (14), we have: $\forall(x, y) \in \lambda_2$, $$e_h^\gamma(\lambda, x, y, x', y') = (2\pi)^{-2}(\lambda + V_2(x, y))_+^{1+\gamma} C_\gamma h^{-2} + \vartheta(h^\gamma), \tag{17}$$
$$h \to 0,$$

uniformly in $\Omega_2$, where $c_\gamma = \int_{\mathbb{R}^2} (1-\eta^2-\eta'^2)_+^\gamma d\eta d\eta'$, and $(\bullet)_+$ refers to the positive part.

Theorem 4.3

Let $V_2$ be a real valued function considered as potential of the Schrödinger operator (4) belonging to $C^\infty(\mathbb{R}^2)$, with $$-\infty < \inf V_2 < \lim_{\substack{|x| \to +\infty \\ |y| \to +\infty}} \inf V_2 \tag{18}$$

and h is a semi-classical parameter. We denote by:

$$S_\gamma(h, \lambda) = \sum_{\lambda_{n,h} \leq \lambda} \sum_{\lambda_{m,h} \leq \lambda} (\lambda - (\lambda_{n,h}^x + \lambda_{m,h}^y))_+^\gamma, \, y \geq 0 \tag{19}$$

the Riesz means of the decreasing eigenvalues $\lambda_{n,h}$ and $\lambda_{m,h}$ less than $\lambda$ of the Schrödinger operators $H_{l,h}^x(\frac{1}{2}V_2(\bullet, y))$ and $H_{l,h}^y(\frac{1}{2}V_2(x, \bullet))$ respectively. Then for $\gamma > 0$, we have:

$$S_\gamma(h, \lambda) = \frac{1}{h^2}\left(L_{2,\gamma}^{cl} \int_{R^2} (\lambda + V_2(x, y))_+^{1+\gamma} dxdy + \partial(h^{2+\gamma})\right), h \to 0 \tag{20}$$

where $(\bullet)_+$ is the positive part and $L_{2,\gamma}^{cl}$, known as the suitable universal semi-classical constant, is given by (12).

Proof of Theorem 4.1

A proof can be obtained by using some Riesz means connected to a Lieb-Thirrings conjecture proposed by Helffer and Robert (Theorem (4.3)), and a suitable extension of Karadzhov's theorem on the spectral function (Theorem 4.2).

First, by combining the formulas (16) and (17), we found: $\forall(x, y) \in \lambda_2$ $$\sum_{\lambda_{n,h}^x \leq \lambda} \sum_{\lambda_{n,h}^y \leq \lambda} (\lambda - (\lambda_{n,h}^x + \lambda_{m,h}^y))_+^\gamma \varphi_{n,h}^2(x) \phi_{m,h}^2(y) = \tag{21}$$

$$(2\pi h)^{-2}(\lambda + V_2(x, y))_+^{1+\gamma} v_\gamma + \partial(h^{2+\gamma}), h \to 0$$

where $h \to 0$, $(\bullet)_+$ is the positive part, and $$c_\gamma = \int_{\mathbb{R}^2} (1-\eta^2-\eta'^2)_+^\gamma d\eta d\eta' \tag{22}$$

A simple expression for $c_\gamma$ can be found. By integrating the right part of the equation (21) over x and y:

$$\int_{\lambda_2}\left(\sum_{\lambda_{n,h}\leq\lambda}\sum_{\lambda_{n,h}\leq\lambda}(\lambda-(\lambda_{n,h}^x+\lambda_{m,h}^y))_+^{1+\gamma}\varphi_{n,h}^2(x)\phi_{m,h}^2(y)\right)dxdy = \sum_{\lambda_{n,h}\leq\lambda}\sum_{\lambda_{n,h}\leq\lambda}(\lambda-(\lambda_{n,h}^x+\lambda_{m,h}^y))_+^\gamma, h\to 0,$$

$$= S_\gamma(h,\lambda), h\to 0.$$

On the other hand:

$$\int_{\lambda_2}h^{-2}(\lambda+V_2(x,y))_+^{1+\gamma}(2\pi)c_\gamma dxdy + \partial(h^{2+\gamma}) = \int_{\lambda_2}\sum_{\lambda_{n,h}\leq\lambda}\sum_{\lambda_{n,h}\leq\lambda}(\lambda-(\lambda_{n,h}^x+\lambda_{m,h}^y))_+^\gamma\varphi_{n,h}^2(x)\phi_{m,h}^2(y)dxdy$$

$$= S_\gamma(h,\lambda), h\to 0.$$

Therefore, for $\gamma>0$, and by using Theorem 4.3:

$$\int_{\lambda_2}h^{-2}(\lambda+V_2(x,y))_+^{1+\gamma}(2\pi)^{-2}c_\gamma dxdy + \partial(h^{2+\gamma}) =$$

$$\frac{L_{2,\gamma}^{cl}}{h^2}\int_{\lambda_2}(\lambda+V_s(x,y))_+^{1+\gamma}dxdy + \partial(h^{2+\gamma}), h\to 0.$$

Which implies:

$$(2\pi)^{-2}c_\gamma = L_{2,\gamma}^{cl}$$

$$= \frac{1}{2^2\pi}\frac{\Gamma(\gamma+1)}{\Gamma(\gamma+2)}.$$

Finally, when the semi-classical parameter h converges to 0, and by taking only the positive part of the potential $V_2$, we have: $\forall (x,y)\in\Omega_2$.

$$V_2(x,y) = -\lambda + \lim_{h\to 0}\left(\frac{h^2}{L_{2,\gamma}^{cl}}\sum_{n=1}^{N_h^2}\sum_{m=1}^{M_h^2}(\lambda-(\lambda_{n,h}^x+\lambda_{m,h}^y))^\gamma\varphi_{n,h}^2(x)\phi_{m,h}^2(y)\right)^{\frac{1}{1+\gamma}}.$$

Corollary 1

Under the same conditions as the Proposition 3.1, we have:

$$\int_{\Omega_2}(\lambda+V_2(x,y))^{1+\gamma}dxdy = \lim_{h\to 0}\int_{\Omega_2}(\lambda+V_{2,h,\gamma,\lambda}(x,y))^{1+\gamma}dxdy. \tag{23}$$

Proof. According to the proposition 3.1:

According to Theorem (4.3):

$$\lim_{h\to 0}\left(\frac{h^2}{L_{2,\gamma}^{cl}}\sum_{n=1}^{N_h^2}\sum_{m=1}^{M_h^2}(\lambda-(\lambda_{n,h}^x+\lambda_{m,h}^y))^\gamma\right) = \int_{\Omega_2}(\lambda+V_2(x,y))^{1+\gamma}dxdy,$$

completing the proof.

The two-dimensional SCSA formula (13) can depend on three parameters: λ, γ and h, λ gives information on the part of the signal that will be reconstructed. For simplicity λ can equal zero in the following, even if λ=0 is not an allowed value, as in one dimensional it works very well.

As for remaining parameters, only the semi-classical parameter h affects the eigenvalues and eigenfunctions since the operator depends on its values. Also, the number of negative eigenvalues can depend on h. Indeed, as h decreases $N_h$ (resp. $M_h$) increases. Similarly to the Fourier method trade-offs exist between the number of basis elements to handle and the desired reconstruction. From the implementation point of view, it is better to have a good representation of the image with a small enough number of eigenvalues. So h is chosen to be large enough to have a good reconstruction with the small number of eigenvalues. Moreover, in SCSA analysis, the parameter γ can improve the approximation of the signal for a given small number of negative eigenvalues. This means that for a given h ($N_h$, $M_h$), the representation of the image can be improved, for example, by changing the value of γ.

It can be helpful to describe a numerical scheme for reconstructing an image with the two-dimensional SCSA.

Figure 6:
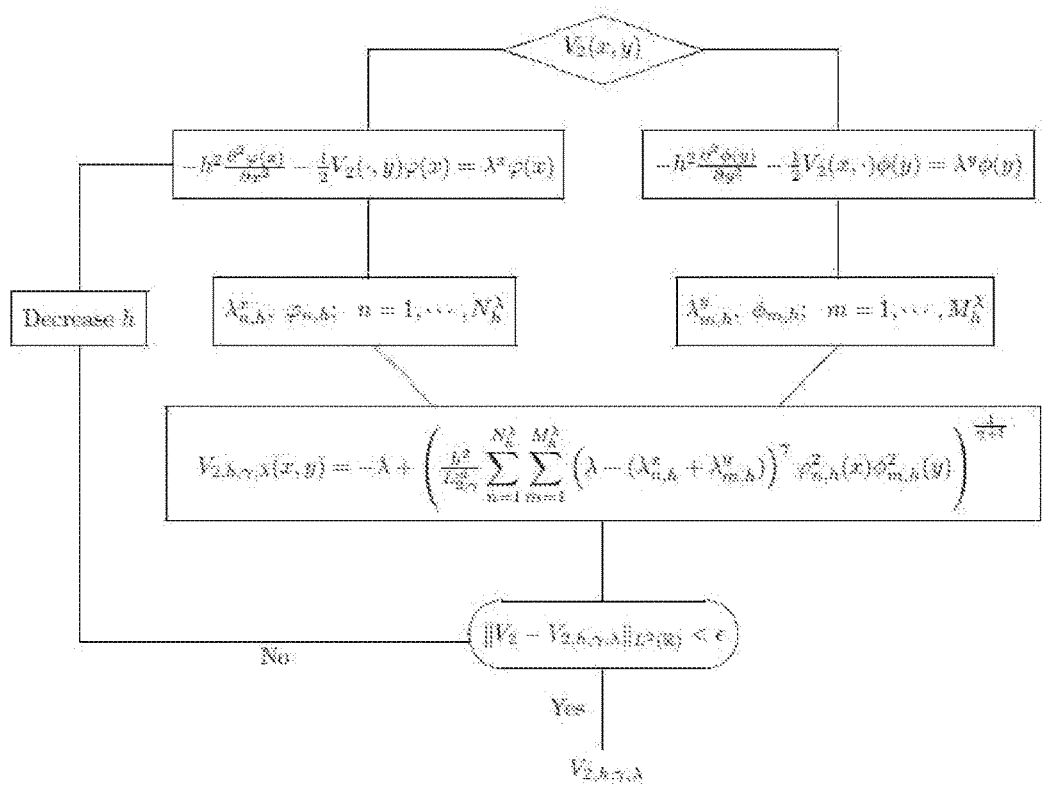
FIG. 6 illustrates a flow chart according to an exemplary embodiment.

FIG. 6 shows an exemplary way of reconstructing an image with two-dimensional SCSA. A Fourier pseudo-spectral method can be utilized to discretize the Schrödinger operator (Equation (1)).

$$\int_{\Omega_2}(\lambda+V_{2,h,\gamma,\lambda}(x,y))^{1+\gamma}dxdy = \int_{\Omega_2}\left(\frac{h^2}{L_{2,\gamma}^{cl}}\sum_{n=1}^{N_h^2}\sum_{m=1}^{M_h^2}(\lambda-(\lambda_{n,h}^x+\lambda_{m,h}^y))^\gamma\varphi_{n,h}^2(x)\phi_{m,h}^2(y)\right)dxdy$$

$$= \frac{h^2}{L_{2,\gamma}^{cl}}\sum_{n=1}^{N_h^2}\sum_{m=1}^{M_h^2}(\lambda-(\lambda_{n,h}^x+\lambda_{m,h}^y))^\gamma.$$

EXAMPLES

Example 1

Consider the following function:

$$V_2(x,y)=\sin(\tfrac{1}{2}x^2+\tfrac{1}{4}y^2+3)\cos(2x+1-e^y)+1 \quad (24)$$

Assume that $V_2$ is given in a discrete case where $x_i=iT_s$, and $y_j=jT_s$, for $i, j=-50, \ldots, 150$ with $T_s=0.02$.

The design parameters h and γ can have influences. For example, by taking different values of h and γ, and by estimating the variation of the mean square errors between $V_2$ and the estimation $V_{2,h,\gamma,0}$ $$EQM = \frac{\sum_{i=1}^{n}\sum_{j=1}^{n}(V_2(i,j)-V_{2,h,\gamma,\lambda}(i,j))^2}{n\times n} \quad (25)$$

where n, is the number of discrete points. There is a minimum at $h=6\times10^{-3}$ and $\gamma=4$ as illustrated in FIG. 1(a). $V_2$ can be estimated, e.g., using $V_{2,h,\gamma,0}$ with these optimal parameter values (see FIG. 1(b)). In particular, in FIG. 1(c) is shown the original signal $V_2(-0.62, y_j)$ and the estimated one $V_{2,0.006,4,0}(-0.62, y_j)$ with $y_j=-1, -0.98, \ldots, 3$. Moreover, in FIG. 1(d) is shown the relative error between the function and its estimation.

Figure 2:
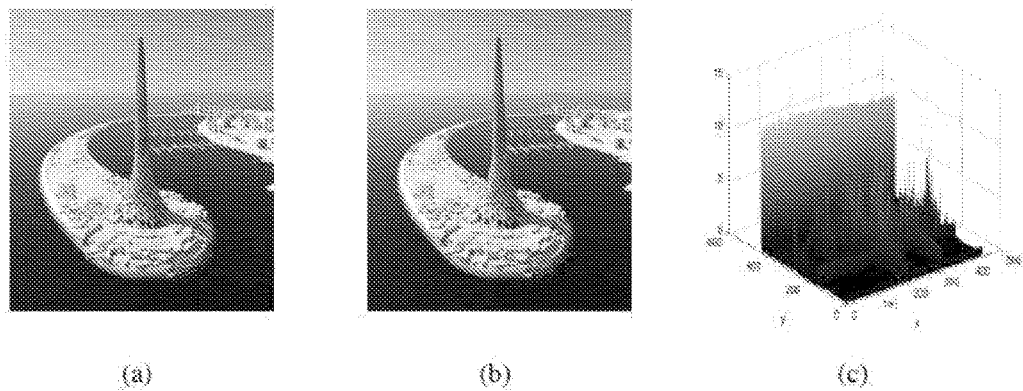
FIG. 2 depicts (a) an image, (b) a reconstructed image, and (c) relative error between the original and reconstructed images.

As another example, FIG. 2(a) considers a 440×440 pixels image. One can note the good reconstruction of this image in FIG. 2(b) for h=0.21 and γ=4. The relative error is shown in FIG. 2(c).

Figure 3:
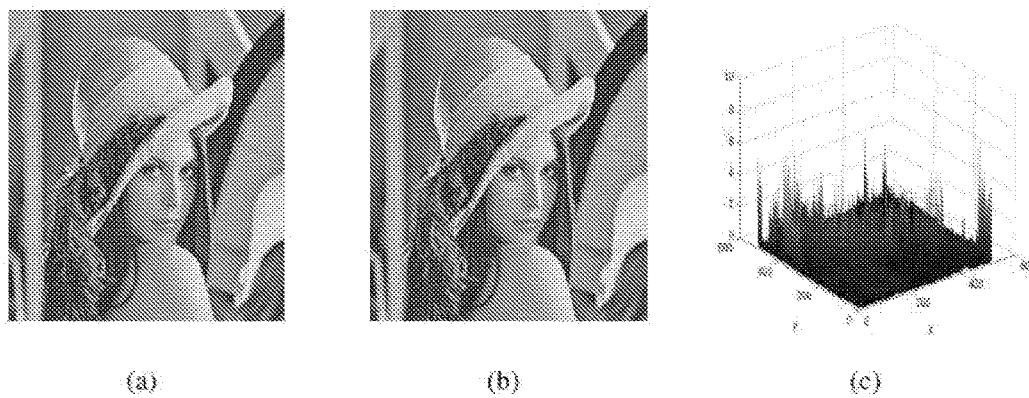
FIG. 3 depicts (a) the well-known Lena's image, (b) the reconstructed image, and (c) relative error between the original and reconstructed images.

As yet another example, FIG. 3(a) considers the well-known 512×512-pixeled Lena image. One can see the good reconstruction of this image in FIG. 3(b), for h=0.2 and γ=4, and the associated relative error in FIG. 3(c).

Figure 4:
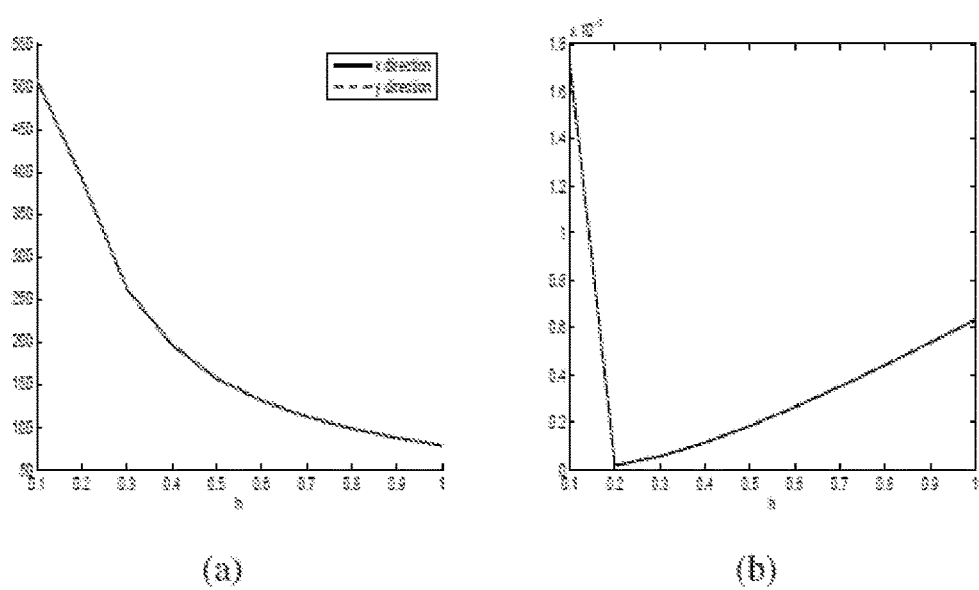
FIG. 4 illustrates (a) a mean of negative eigenvalues in the directions x and y, and (b) the mean square error between original image and its estimated image with respect to h for Lena's image.
Figure 5:
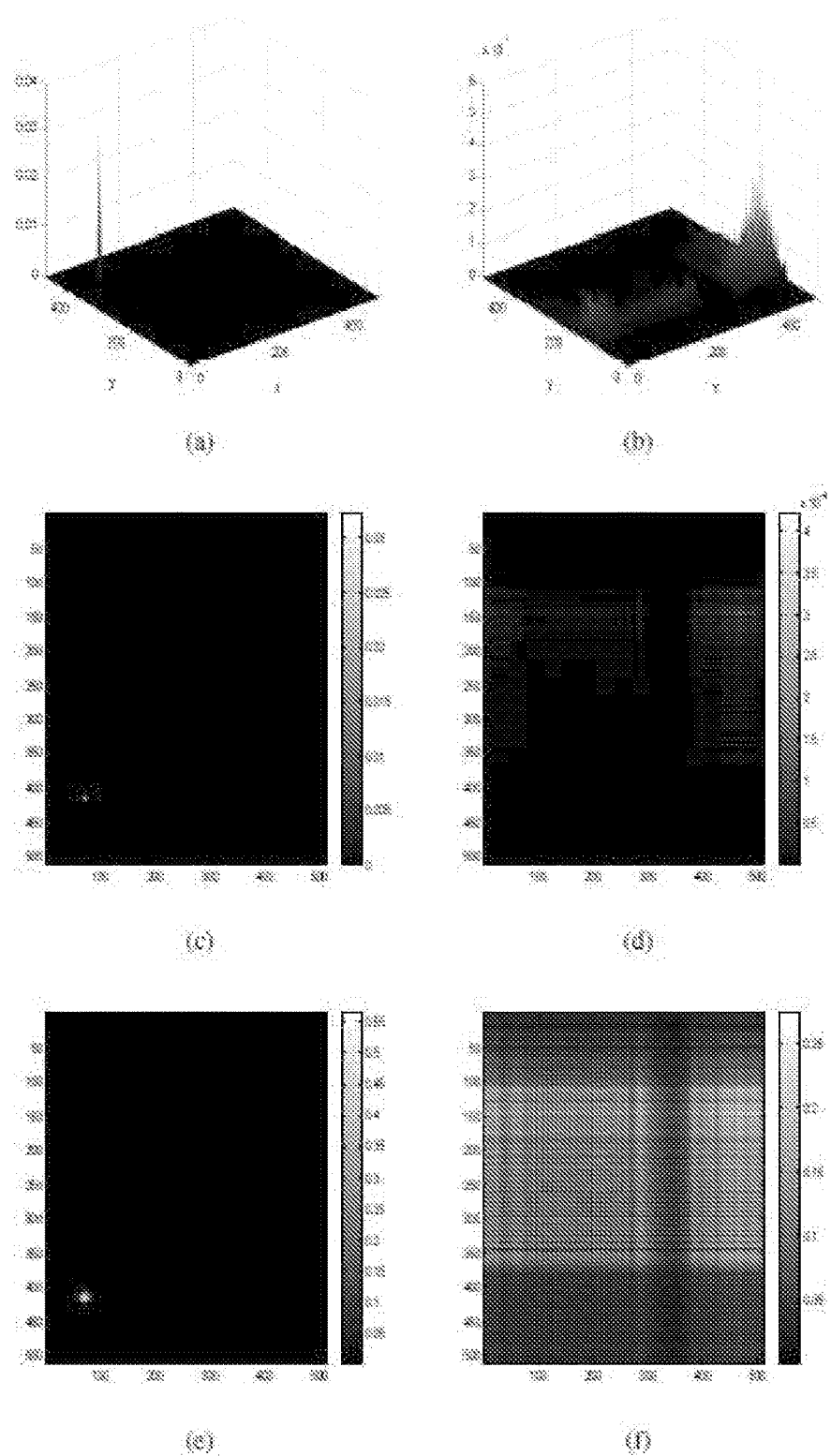
FIG. 5 depicts eigenfunctions of Lena's image.

As Lena's image is the most used as a test image for image processing algorithms, FIGS. 4(a) and 4(b) show the behavior of the negative eigenvalues in x and y directions and the mean square error between original image and its estimated respectively for different values of h. It is clear that the negative eigenvalues ($N_n^\lambda$ and $M_h^\lambda$) decrease when h increases. The FIG. 5(a) illustrates the localization property of the first $L^2$-normalized eigenfunctions for x=1 and y=1 which corresponds to the largest peak in the image. The last $L^2$-normalized eigenfunction for x=512 and y=512 is given by FIG. 5(b). It contains several peaks; they represent the details in the image.

In an embodiment, an image analysis engine can perform the functions directed by programs stored in a computer-readable medium. That is, the embodiments may take the form of a hardware embodiment (including circuits), a software embodiment, or an embodiment combining software and hardware. The present invention can take the form of a computer-program product that includes computer-useable instructions embodied on one or more computer-readable media.

The various image reconstruction techniques, methods, and systems described herein can be implemented in part or in whole using computer-based systems and methods. Additionally, computer-based systems and methods can be used to augment or enhance the functionality described herein, increase the speed at which the functions can be performed, and provide additional features and aspects as a part of or in addition to those described elsewhere in this document.

Various computer-based systems, methods and implementations in accordance with the described technology are presented below.

An image reconstructing system can be embodied by a general-purpose computer or a server and can have an internal or external memory for storing data and programs such as an operating system (e.g., DOS, Windows 2000™, Windows XP™, Windows NT™, OS/2, UNIX or Linux) and one or more application programs. Examples of application programs include computer programs implementing the techniques described herein for lyric and multimedia customization, authoring applications (e.g., word processing programs, database programs, spreadsheet programs, or graphics programs) capable of generating documents or other electronic content; client applications (e.g., an Internet Service Provider (ISP) client, an e-mail client, or an instant messaging (IM) client) capable of communicating with other computer users, accessing various computer resources, and viewing, creating, or otherwise manipulating electronic content; and browser applications (e.g., Microsoft's Internet Explorer) capable of rendering standard Internet content and other content formatted according to standard protocols such as the Hypertext Transfer Protocol (HTTP). One or more of the application programs can be installed on the internal or external storage of the general-purpose computer. Alternatively, application programs can be externally stored in or performed by one or more device(s) external to the general-purpose computer.

The general-purpose computer or server may include a central processing unit (CPU) for executing instructions in response to commands, and a communication device for sending and receiving data. One example of the communication device can be a modem. Other examples include a transceiver, a communication card, a satellite dish, an antenna, a network adapter, or some other mechanism capable of transmitting and receiving data over a communications link through a wired or wireless data pathway.

The general-purpose computer or server may also include an input/output interface that enables wired or wireless connection to various peripheral devices. In one implementation, a processor-based system of the general-purpose computer can include a main memory, preferably random access memory (RAM), and can also include a secondary memory, which may be a tangible computer-readable medium. The tangible computer-readable medium memory can include, for example, a hard disk drive or a removable storage drive, a flash based storage system or solid-state drive, a floppy disk drive, a magnetic tape drive, an optical disk drive (Blu-Ray, DVD, CD drive), magnetic tape, paper tape, punched cards, standalone RAM disks, Iomega Zip drive, etc. The removable storage drive can read from or write to a removable storage medium. A removable storage medium can include a floppy disk, magnetic tape, optical disk (Blu-Ray disc, DVD, CD) a memory card (Compact-Flash card, Secure Digital card, Memory Stick), paper data storage (punched card, punched tape), etc., which can be removed from the storage drive used to perform read and write operations. As will be appreciated, the removable storage medium can include computer software or data.

In alternative embodiments, the tangible computer-readable medium memory can include other similar means for allowing computer programs or other instructions to be loaded into a computer system. Such means can include, for example, a removable storage unit and an interface. Examples of such can include a program cartridge and cartridge interface (such as the found in video game devices), a removable memory chip (such as an EPROM or flash memory) and associated socket, and other removable storage units and interfaces, which allow software and data to be transferred from the removable storage unit to the computer system.

In some embodiments, the video stream and the extracted image data can be stored in a memory or storage device such as those discussed above. A copy of the extracted image data can be used for processing.

An example of the video image data processing can be symbol (or object) based. Using image processing technique such as color edge detection, a symbol of a screen or an image of the video can be isolated. The symbol can be identified using an object template database. For example, the symbol includes 4 legs and a tail, and when matched with the object template database, the symbol may be identified as a dog. The object template database can be adaptive and therefore, the performance would improve with usage.

Other image data processing techniques may include image extraction, high-level vision and symbol detection, figure-ground separation, depth and motion perception.

Example 2. Image Denoising Using Squared Eigenfunctions of the Schrödinger Operator Disclosed herein is a new method for image denoising. The proposed method is based on using a tensor product of an adaptive set of spatially shifted and localized function which is given by the squared $L^2$-normalized eigenfunctions associated to the negative eigenvalues of one dimensional semi-classical Schrödinger operator. By choosing the good value of the semi-classical parameter h, the experimental results demonstrate that, in comparison with other existing methods as SVD, the proposed method has better performance in term of PSNR, SSIM and visual quality at different levels of noise. Hence the main advantage of this method is its efficiency and stability in denoising processes, due to the localization property of the eigenfunctions and the pertinent information that they contain.

Image denoising is very important for image interpretation and visualization. It is usually a preliminary step in image processing to filter the noise. It is important that an image denoising algorithm preserves pertinent information in the image. Various methods for image denoising have been presented in the literature. Some of the proposed techniques are based on spatial filtering, wavelet theory, or more recently on partial differential equation (PDE). See, R. C. Gonzalez and R. E. Woods, Digital Image Processing. Prentice-Hall, (2008), T. C. Lin. A new adaptive center weighted median filter for suppressing impulsive noise in images. Information Sciences—Elsevier. Volume 177, (2007), 1073-1087, I. E. Fodor and C. Kamath, On denoising images using wavelet-based statistical techniques. Technical report UCRLJC-142357, Lawrence Livermore National Laboratory, (2001), Z. Hou, Adaptive singular value decomposition in wavelet domain for image denoising. Pattern Recog. Volume 36, (2003), 1747-1763, S. M. Chao and D. M. Tsai, An improved anisotropic diffusion model for detail and edge-preserving smoothing". Pattern Recognition Letters. Volume 31, (2010), 2012-2023, and N. Khan, K. V. Arya and M. Pattanaik, A robust PDE based image denoising method. Proceedings of the IEEE International Conference Signal Acquisition and Processing (IC-SAP 2011). Volume 1, (Feb. 26-28, 2011), 136-139, each of which is incorporated by reference in its entirety. PDE based approaches assume that the intensity of the illumination on the edges varies like a geometric heat flow. These techniques can allow good denoising and reduce noise homogeneously but they can soften the edges. A method on anisotropic diffusion equations in pixon domain has been proposed in Nadernejad et al. to overcome this difficulty but with some assumptions on the image and with boundary conditions which are not in general satisfied. See, E. Nadernejad, Sara Sharifzadeh and S. Forchhammer, Using anisotropic diffusion equations in pixon domain for image denoising. Springer-Verlag London. DOI 10.1007/s11760-012-0356-7, which is incorporated by reference in its entirety.

A semi-classical based approach, called SCSA for Semi-Classical Signal Analysis, has been proposed for signal analysis. See. B. Helffer and T. M. Laleg-Kirati, On semi-classical questions related to signal analysis. Asymptotic Analysis Journal, volume 75, Number 3-4, (2011), 125-144, and T. M. Laleg-Kirati, E. Crépeau and M. Sorine, Semi-classical signal analysis. Mathematics of Control, Signals, and Systems (MCSS) Journal. Volume 25, Issue 1, (2013), 37-61, each of which is incorporated by reference in its entirety. This method has been extended to two dimension for image representation. See, Z. Kaisserli, T. M. Laleg-Kirati and A. Lahmar-Benbernou A novel algorithm for image representation using discrete spectrum of the Schrödinger operator. Submitted, and Z. Kaisserli and T. M. Laleg-Kirati Image representation and denoising using squared eigenfunctions of Schrödinger operator, each of which is incorporated by reference in its entirety. The main idea of this approach consists in decomposing the image using a set of spatially shifted and localized functions which are given by the tensor product of the squared L2-normalized eigenfunctions associated to the discrete spectrum of the one dimensional semi-classical Schrödinger operator for each row and column of the image. See, D. E. Dudgeon and G. Lorentz, Constructive approximation. Comprehensive studies in mathematics, Springef-Varlag. Volume 303. 1993, and A. K. Jain, Fundamentals of digital image processing. Prentice-Hall, (1989), each of which is incorporated by reference in its entirety. The operator's potential is given by the considered image. It has been shown that the discrete spectrum consisting of negative eigenvalues and the squared L2-normalized eigenfunctions can be used to decompose, reconstruct and analyze the image. See, Also, it has been shown that use of tensor product, by splitting the 2D operator into two 1D operators, in the representation of the image simplifies the computation in terms of complexity and processing time and allow the use of parallel computing. See, D. E. Dudgeon and G. Lorentz, Constructive approximation. Comprehensive studies in mathematics, Springef-Varlag. Volume 303. 1993, and A. K. Jain, Fundamentals of digital image processing. Prentice-Hall, (1989), each of which is incorporated by reference in its entirety.

The SCSA method can be used for or image denoising. Comparing to the SVD method, which is also based on an eigenvalue decomposition, the proposed algorithm has a better performance in denoising and preserving image edges thanks to the local properties of its eigenfunctions even at high noise levels. For SVD method, see, M. Aharon, M. Elad, and A. M. Brukstein, The K-SVD: an algorithm for denoising of overcomplete dictionaries for sparse representation. IEEE Transaction on Signal Processing. Volume 54, Number 11, (2006), 4311-4322, M. Elad and M. Aharon, Image denoising via sparse and redundant representations over learned dictionaries. IEEE Transaction on Image Processing. Volume 303, Number 12, (2006), 3736-3745, Y. He, T. Gan, W. Chen and H. Wang, Adaptive denoising by singular value decomposition. IEEE Signal Processing Letters. Volume 18, Number 4, (2011), 215-218, and L. Zhang, W. Dong, D. Zhang, and G. Shi, Two-stage image denoising by principal component analysis with local pixel grouping. Pattern Recognition Elsevier. Volume 43, (2010), 1531-1549, each of which is incorporated by reference in its entirety.

Algorithm for Image Representation

In the following 2D semi-classical Schrödinger operator associated to a potential $V_2$:

$$\mathcal{H}_h(V_2) = -h^2\Delta - V_2 \qquad (26)$$

where $$\Delta = \frac{\partial^2}{\partial x^2} + \frac{\partial^2}{\partial y^2}$$

is the 2D Laplacian operator $h \in \mathbb{R}_+^*$ is the semi-classical parameter, and $V_2$ is a positive real valued function belonging to $\mathcal{C}^\infty(\Omega_2)$ where $\Omega_2 = ]a,b[\times]c,d[$ is a bounded open set of $\mathbb{R}^2$.

Inspired from semi-classical properties of the Schrödinger operator, and the 1D SCSA formula, the extension of the SCSA formula in 2D case is given by the following theorem.

Let $V_2$ be a positive real valued $\mathcal{C}^\infty$ function on $\Omega_2$ considered as potential of Schrödinger operator (26). Then, for any pair $(\Lambda_2, \lambda)$ such that $\Lambda_2 \subset \Omega_2$, is compact and $$\begin{cases} \lambda < \inf(-V_2(a,c), -V_2(b,d)), \\ V_2(\Lambda_2) \subset ]-\lambda, +\infty[, \\ \lambda \text{ is not a critical value of } -V_2, \end{cases} \qquad (27)$$

and, uniformly for $(x, y) \in \Lambda_2$, $$V_2(x, y) = -\lambda + \lim_{h \to 0}\left(\frac{h^2}{L_{2,\gamma}^{cl}} \sum_{k=1}^{K_h^\lambda} (\lambda - \mu_{k,h})^\gamma \psi_{k,h}^2(x,y)\right)^{\frac{1}{1+\gamma}} \qquad (28)$$

where $\gamma \in \mathbb{R}_+^*$, and $L_{2,\gamma}^{cl}$ is the suitable universal semi-classical constant given by:

$$L_{2,\gamma}^{cl} = \frac{1}{2^2\pi} \frac{\Gamma(\gamma+1)}{\Gamma(\gamma+2)} \qquad (29)$$

$\Gamma$ refers to the standard Gamma function.

Moreover, $\mu_{k,h}$ and $\Psi_{k,h}$ denote the negative eigenvalues with $\mu_{1,h} < \ldots < \mu_{K_h^\lambda,h} < \lambda$, $K_h^\lambda$ is a finite number of the negative eigenvalues smaller than $\lambda$, and associated $L^2$-normalized eigenfunctions of the operator $H_h(V_2)$ such that:

$$\mathcal{H}_h(V_2)\Psi_{k,h} = \mu_{k,h}\Psi_{k,h}, k=1,\ldots,K_h^\lambda. \qquad (30)$$

The proof of the Theorem is obtained using a generalization of Theorem 4.1 proposed by Helffer and Laleg in B. Helffer and T. M. Laleg-Kirati, On semi-classical questions related to signal analysis. Asymptotic Analysis Journal. Volume 75, Number 3-4, (2011), 125-144, which is incorporated by reference in its entirety. Helffer and Laleg uses an extension of Karadzhov's theorem on the spectral function (see, G. E. Karadzhov, Semi-classical asymptotic of spectral function for some Schrödinger operator. Math. Nachr. Volume 128, (1986), 103-114, which is incorporated by reference in its entirety). The connection of the Riesz means with Leib-Thirring conjecture proposed by Helffer and Laleg in B. Helffer and D. Robert, Riesz means of bound states and semiclassical limit connected with a Lieb-Thirring's conjecture I. Asymptotic Analysis Journal, Volume 3, (1990), 91-103, which is incorporated by reference in its entirety.

Theorem 5.1

Let I be an image on space of square matrices $\mathcal{M}_{N \times N}(\mathbb{R}_+)$. The discretization of the eigenvalue problem (30) is given by the following eigenvalue problem for matrix, $$H_h(I[i,j])\underline{\Psi}_{k,h}[i,j] = \mu_{k,h}\underline{\Psi}_{k,h}[i,j] \qquad (31)$$

where $\mu_{k,h}$ and $\underline{\Psi}_{k,h}$ for $k=1, \ldots, K_h^\lambda$ with $K_h^\lambda < N+N'$, refer to the negative eigenvalues with $\mu_{1,h} < \ldots < \mu_{K_h^\lambda,h} < \lambda$ and associated $l^2$-normalized eigenventors respectively of the 2D discretized semi-classical Schrödinger operator $H_h$ and i, $j=1, \ldots, N$ refer to the $i^{th}$ row and $j^{th}$ column of the matrix respectively.

To solve the 2D eigenvalue problem (31), the idea consists in solving 1D eigenvalues problems and combining the results using the tensor product as it is often done in image processing. See, for example, M. N. Do and M. Vetterli, The finite ridgelet transform for image representation. IEEE trans. Image Processing, vol. 12, No. 1, (January 2003), 16-28, and S. Mallat, A wavelet tour of signal processing: The sparse way. Third Edition, Elsevier, 2009, each of which is incorporated by reference in its entirety. This means that the problem can be solved rows by rows and columns by columns which can simplify computations in terms of complexity and computation time and allow the use of parallel computing.

In a discrete case, decoupled rows and columns of the 1D operators can be given respectively by:

$$A_{i,h}(I[i,:]) = -h^2 D_2 - \text{diag}(\frac{1}{2}I[i,:]) \qquad (32)$$

$$B_{j,h}(I[:,j]) = -h^2 D_2 - \text{diag}(\frac{1}{2}I[:,j]) \qquad (33)$$

where $D_2$ is a second order differentiation matrix obtained by using the Fourier pseudo-spectral method, diag $(\frac{1}{2}I[i,:])$ and diag $(\frac{1}{2}I[:,j])$ are the diagonal matrices of the 1D signal, row and column signals respectively.

Associated spectral problems can be given by:

$$A_{i,h}(I[i,:])\underline{\varphi}_{i,n,h} = \kappa_{i,n,h}\underline{\varphi}_{i,n,h}, \qquad (34)$$

$$B_{j,h}(I[:,j])\underline{\phi}_{j,m,h} = \rho_{j,m,h}\underline{\phi}_{j,m,h}. \qquad (35)$$

In particular, for the pixel [i,j], the eigenvalue problem (34) (resp. (35)) is solved, and then all the negative eigenvalues $\kappa_{i,n,h}$ (resp. $\rho_{j,m,h}$) and the $j^{th}$ (resp. $i^{th}$) associated $l^2$-normalized eigenvectors $\underline{\varphi}_{i,n,h}$ for $n=1, \ldots, N_h^\lambda$ (resp. $\underline{\phi}_{j,m,h}$ for $m=1, \ldots, M_h^\lambda$) are taken. Hence, $$\underline{\varphi}_{i,n,h}[j] \underline{\phi}_{j,m,h}[i] = \underline{\Psi}_{k,h}[i,j], \qquad (36)$$

$$\kappa_{i,n,h} + \rho_{j,m,h} = \mu_{k,h}. \qquad (37)$$

Then, based on the Theorem 5.1, the reconstruction of the image can be done pixel by pixel as it is often the case in image processing as follows, Definition 6.1

Let $I \in M_{N \times N}(\mathbb{R}_+)$ be a positive real valued square matrix. Then, the approximation by the SCSA method of I is defined by the following formula: $\forall(i, j) \in \{1, 2, \ldots, N\}^2$, $$I_{h,\gamma,\lambda}[i, j] = -\lambda\left(\frac{h^2}{L_{2,\gamma}^{cl}} \sum_{n=1}^{N_h^\lambda} \sum_{m=1}^{M_h^\gamma}\right. \qquad (38)$$

$$\left.(\lambda - (\kappa_{i,n,h} + \rho_{j,m,h}))^\gamma \underline{\varphi}_{i,n,h}^2[j] \underline{\phi}_{j,m,h}^2[i]\right)^{1/1-t},$$

where $h \in \mathbb{R}_+^*$, $\gamma \in \mathbb{R}_+$, $\lambda \in \mathbb{R}_-$ and $L_{2,\gamma}^{cl}$, known as the suitable universal semi-classical Schrödinger operator given by (32), is the universal semi-classical constant.

Moreover, $\kappa_{i,n,h}$ (resp. $\rho_{j,m,h}$) are the negative eigenvalues of the one-dimensional semi-classical Schrödinger operator given by (32) (resp. (33)) with $\kappa_{i,1,h} < \ldots < \kappa_{i,N_h^\lambda,h} < \lambda$ (resp. $\rho_{j,1,h} < \ldots < \rho_{j,M_h^\lambda,h} < \lambda$), $N_h^\lambda$ (resp. $M_h^\lambda$) is the number of the negative eigenvalues smaller than $\lambda$, and $\varphi_{i,n,h}$ (resp. $\varphi_{j,m,h}$) are the associated $L^2$-normalized eigenvectors such that:

$$A_{i,h}(I[i,:])\varphi_{i,n,h} = \kappa_{i,n,h}\varphi_{i,n,h}, n=1, \ldots, N_h^\lambda \quad (39)$$

$$(resp. B_{j,h}(I[:,j])\varphi_{j,m,h} = \rho_{j,m,h}\varphi_{j,m,h}, m=1, \ldots, M_h^\lambda) \quad (40)$$

Along with the several numerical validation performed in Z. Kaisserli, T. M. et al., Theorem 5.1 shows the importance of the parameter h in the representation of the image. Indeed the number of the negatives eigenvalues $N_h^\lambda \times M_h^\lambda$ increases when h decreases. However, in practice, it has been shown that good results are obtained with a smaller number of eigenvalues (i.e.: for h large enough), this comes from the localization property of the eigenfunctions and the pertinent information that they contain. In fact the first eigenfunction gives a good localization of the largest peak in the image, the second for the two peaks that follow the largest peak, then the last eigenfunctions present several oscillations, which allow the representation of the details in the image. This property motivates the use of this method for image denoising. Indeed the idea consists in retaining the most significant eigenfunctions belonging to the noisy image, which are given by the first ones, and discard those representing noise. Instead of a naive truncation of the sum (formula (28)), which will lead to neglect important details in the image, the number of oscillations can be reduced by increasing the value of the semi-classical parameter h. This implies that the parameter h has to be efficiently chosen to achieve this task. One way to find an appropriate value for h is to minimize an appropriate cost function consisting of the norm of the estimation error and a smoothing term given by the norm of the denoised signal.

For the design parameters that depend this method, it has been shown that the parameter $\lambda$ gives information on the part of the signal to be reconstructed, for sake of simplicity, $\lambda$ is set to zero in the following. By contrast, the parameter $\gamma$ may improve the approximation of the image for a given small number of negative eigenvalues, here $\gamma=4$ was taken.

Image Denoising Based 2D Squared $L^2$-Normalized Eigenfunctions

The proposed method uses only negative eigenvalues and associated squared $L^2$-normalized eigenfunctions of the semi-classical Schrödinger operator, where the noisy image is considered as a potential of this operator. This quantities that depend only on the noisy image, represent the two main features which account for the performance improvement, unlike the existing methods which use some quantities which not always dependent on the image itself.

In this section, numerical example shows the efficiency and the stability of the proposed method. The peak signal-to-noise ratio (PSNR), the structural similarity index (SSIM), and the mean structural similarity index (MSSIM) are employed as objective indices to evaluate the image quality of the denoised images. See, Z. Wang, A. C. Bovik, H. R. Sheikh, and E. P. Simoncelli, Image quality assessment: from error visibility to structural similarity. IEEE Transaction on Image Processing. Volume 4, Number 13, (2004), 1-14, which is incorporated by reference in its entirety. The images are subject to additive Gaussian white noise with zero mean and different level of standard deviation a (different values of SNR).

The proposed algorithm can be stated as follows:

---

Algorithm 1: Algorithm for image denoising

---

Input: The image to be denoised
Output: Denoised image
    Step 1: Initialize h, $\lambda$ and $\gamma$.
    Step 2: Discretize the 1D Laplace operator $D_2$.
    Step 3: Solve 1D eigenvalue problems (34) and (35) (for all rows i and columns j with i; j = , ..., N respectively).
    Step 4: Reconstruct the image using formula (38)
    Step 5: Check stopping criterion,
       - if satisfied end
       - else update h and go to step 3.

---

Figure 7:
FIG. 7 depicts (a) original image of Lena, (b) noisy image for $\sigma=75$ (SNR=11.2 dB)
Figure 7:
Figure 8:
FIG. 8 depicts (a) denoised image with h=1.2 (PSNR=25.4 dB, MSSIM=0.513), (b) Denoised image with h=1.65 (PSNR=25.7 dB, MSSIM=0.556), (c) denoised image with h=2 (PSNR=25:6 dB, MSSIM=0:575).
Figure 8:
Figure 8:

FIG. 7 shows the original image of Lena and the noisy one respectively. The standard deviation σ is equal to 75 and the corresponding SNR is 11.2 dB. FIG. 8B illustrates the denoising of the Lena's image using the best value of h which is equal to 1.65. However, the use of a value for h smaller than the best value, does not filter completely the noise, but helps to reconstruct the noisy image (see FIG. 8A), and with a larger value of h, the pertinent information in the image are lost because significant eigenfunctions are not accurate as shown in FIG. 8C.

Figure 9:
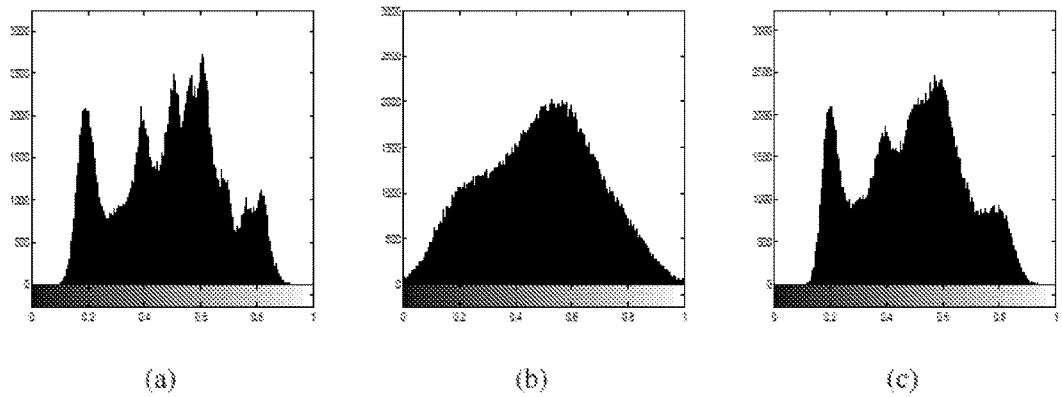
FIG. 9 depicts the histogram of, (a) original image of Lena, (b) noisy image ($\sigma=75$), (c) denoised image.

The histogram of the original image of Lena, the noisy (σ=75) and the denoised one are illustrated, respectively, in FIG. 9. FIG. 9B, which represents the histogram of the noisy image, has the shape of the Gaussian function. Using the SCSA method in the denoising process (FIG. 9C), the shape of the original image (FIG. 9A) is obtained even at high level of noise.

Figure 10:
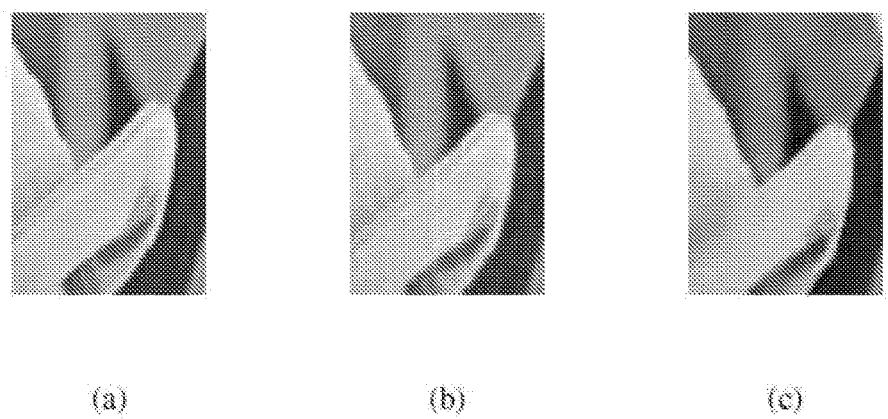
FIG. 10 depicts zoom on denoising of Lena's image corrupted by noise with $\sigma=40$, (a) original image, (b) proposed method, (c) SVD method.

In the following, the proposed method is compared with SVD method (see, M. Aharon, M. Elad, and A. M. Brukstein, The K-SVD: an algorithm for denoising of overcomplete dictionaries for sparse representation. IEEE Transaction on Signal Processing. Volume 54, Number 11, (2006), 4311-4322, and L. Zhang, W. Dong, D. Zhang, and G. Shi, Two-stage image denoising by principal component analysis with local pixel grouping. Pattern Recognition Elsevier. Volume 43, (2010), 1531-1549, each of which is incorporated by reference in its entirety) in noisy case. The choice focused on the SVD method since it is one of the most methods used and it is also based on an eigenvalues decomposition depending on the image. Gaussian white noise was added with zero mean and different levels of standard deviation σ={10, 20, 25, 30, 40, 50, 100} respectively to the original image of Lena. Due to the limitation in space, Table 1 shows the PSNR and MSSIM results of these two algorithms. It is clear that the denoising using the proposed method is better than the SVD method. Particularly, at high noise level, the proposed method provides the best results even if the image has a several texture and provide better visual quality. The edges and textures of the image are better preserved in the proposed method unlike in the SVD method where they are blurred or lost (see FIG. 10). This first results confirms that the proposed method is more robust to additive Gaussian noise.

TABLE 1

The PSNR (in dB) and SSIM results of the denoised image at different noise levels by K-SVD, and proposed method.

| Noise variance | Proposed method | | | K-SVD | |
|---|---|---|---|---|---|
| σ | h | PSNR | SSIM | PSNR | SSIM |
| 10 | 0.350 | 36.0 | 0.991 | 33.2 | 0.916 |
| 20 | 0.550 | 32.1 | 0.955 | 29.4 | 0.851 |
| 25 | 0.650 | 31.0 | 0.893 | 30.0 | 0.836 |
| 30 | 0.800 | 30.1 | 0.861 | 27.5 | 0.796 |
| 40 | 0.975 | 28.7 | 0.787 | 26.0 | 0.747 |
| 50 | 1.000 | 27.5 | 0.713 | 25.0 | 0.697 |
| 100 | 2.100 | 24.4 | 0.671 | 21.5 | 0.559 |

Example 3. Magnetic Resonance Spectroscopy Data De-Noising Using Semi-Classical Signal Analysis Approach: Application to In-Vitro MRS Data The SCSA method can significantly reduce noise while preserving metabolite peak information. This can permit the use of the SCSA with low sensitivity MRS data, especially in studying tissue metabolism in-vivo. This can be validated by a complete study of in-vitro data with internal reference and in-vivo data.

Localized Magnetic Resonance Spectroscopy (MRS) is a powerful technique used to study metabolism of tissue in vivo, to provide information that is useful in several diagnostics and treatment clinical applications. See, Martinez-Bisbal M C, et al. Q J Nucl Med Mol Imaging. 2009; 53(6):618-30, which is incorporated by reference in its entirety. However, the accuracy of the metabolite information is questionable due to the low Signal-to-Noise Ratio (SNR) of the acquired MRS data. Signal averaging is then required to preserve the SNR, which lengthens data acquisition time. To shorten acquisition time while accurately analyzing the collected data, the Semi-Classical Signal Analysis (SCSA) method can be used. See, Laleg-Kirati T M, et al. Semi-classical signal analysis, Math. Cont. Sign. Syst. 2013; 25(1): 37-61, which is incorporated by reference in its entirety. This method employs the Schrödinger operator to extract the most significant eigenfunctions and eigenvalues of the MRS signal, and uses them to reconstruct the denoised MRS signal. The obtained results demonstrate the usefulness of the technique in precisely estimating the metabolite peaks information from low sensitivity in-vitro MRS data.

Material and Methods

In vitro experiments are performed at 3 T (Tim Trio Siemens). Localized water suppressed spectra are acquired using the PRESS sequence (TE/TR=30/2000 ms, voxel size=10*10*20 mm$^3$), from a phantom containing choline chloride (Ch) and N-acetyl-L-aspartic acid (NAA) with known concentrations, 10 mM each. Seven MR spectra with averaging values ranging from 2 to 32 are analyzed using the SCSA method where the signal, denoted y, is considered as potential of a semi-classical Schrödinger operator. The discrete spectrum consisting of negative eigenvalues, is computed and used to reconstruct the signal as follows, $y_h(x) = 4h \sum_{n=1}^{N_h} \sqrt{-\lambda_{n,h}} \psi_{n,h}^2(x)$, $x \in \mathbb{R}$ where $\lambda_{n,h}$ and $\psi_{n,h}$ are the negative eigenvalues and the corresponding $L^2$-normalized eigenfunctions of the Schrödinger operator, respectively, such that:

$$-h^2 \frac{d^2 \psi(f)}{df^2} - y(f)\psi(f) = \lambda \psi(f).$$

The parameter h plays an important role in the SCSA. When h decreases, the approximation improves. However in the de-noising process, it is recommended to retain the eigenfunctions belonging to the signal and discard those representing noise. This is achieved by an efficient choice of the parameter h, which is done by minimizing the following cost function‖

$$y(l) - y_h(l) \| + \frac{\alpha}{|e|}, \text{ where } e = \frac{\max(y)}{std(y(m_1:m_2))} - \frac{\max(y_h)}{std(y_h(m_1:m_2))},$$

where $(m_1:m_2)$ and l are the noise and signal regions respectively. The quantity $$\frac{\max(y)}{std(y(m_1:m_2))}$$

is used to compute the SNR. $\alpha$ is a weight function.

Results/Discussion

Figure 11:
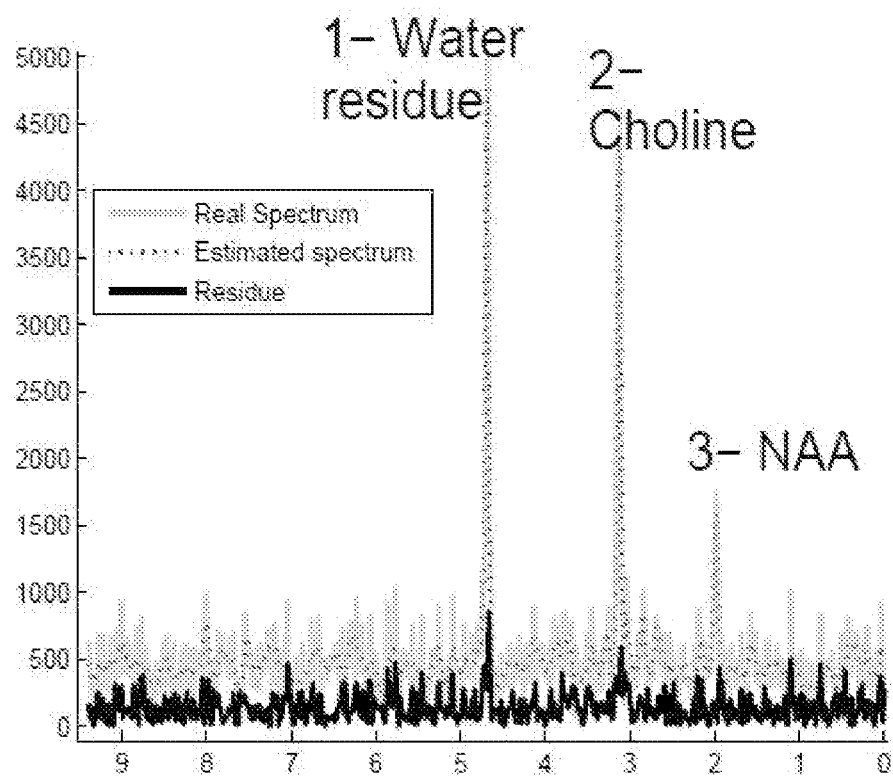
FIG. 11 depicts a magnetic resonance spectrum $N^o$ 1 with avg.=2.

FIG. 11 shows a noisy in-vitro spectrum (blue) and the reconstructed SCSA spectrum (red). A zoom on the choline and NAA region is shown on FIG. 12, where the difference in spectra is shown in green.

Figure 12:
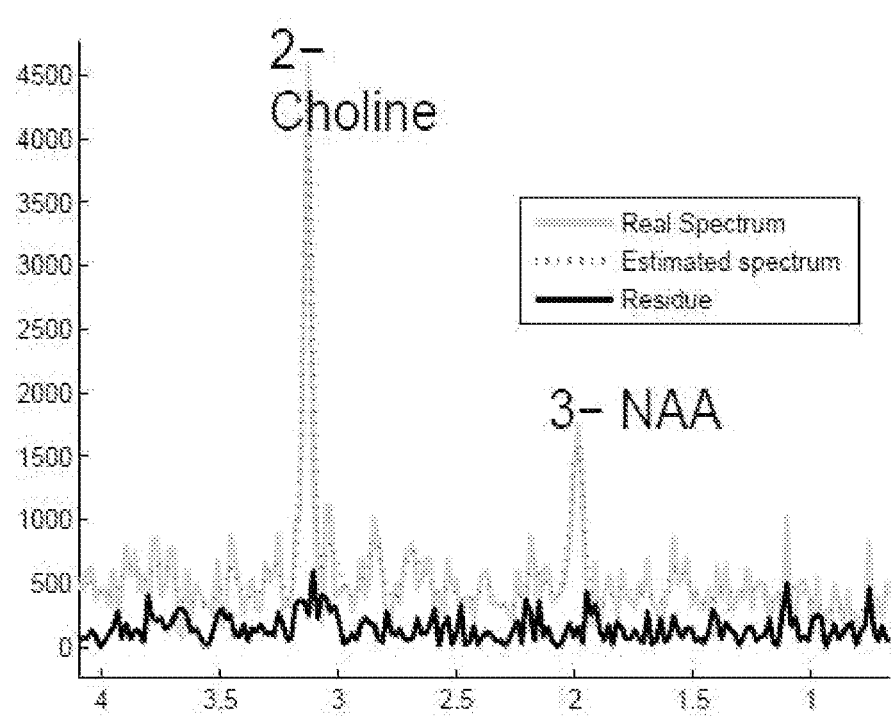
FIG. 12 depicts zoom on the Choline and NAA peaks.

A significant SNR increase on MRS data is obtained using the SCSA method (FIGS. 11, 12). The quantification results of the metabolite peaks from the seven spectra (Table 2), demonstrate that SCSA is able to accurately analyze the data with different sensitivity levels (Table 3). The quantification is performed using an in-house Matlab program. Table 3 reports the amount of SNR increase for each spectrum and the corresponding h value used to separate between eigenfunctions of the signal and noise.

The preliminary absolute quantification results (not shown) using water line as a reference (see, Serrai H. et al. J. Magn. Reson. 2001; 149(1):45-51, which is incorporated by reference in its entirety) are better for both metabolites after the SCSA than before SCSA.

TABLE 2

Quantification results before and after SCSA (bold). The calculated Choline and NAA peak areas qre in arbitrary values (a.u).

| Peak area | Spec. N | | | | | | | |
|---|---|---|---|---|---|---|---|---|
| (a.u) | 1 | 2 | 3 | 4 | 5 | 6 | 7 | Avg ± std |
| Choline (a.u) | 14.5 | 17.4 | 16.9 | 16.7 | 16.8 | 17.5 | 16.5 | 16.6 ± 1 |
|  | 15.1 | 17.5 | 17.7 | 17.7 | 19.0 | 19.4 | 18.5 | 17.8 ± 1.4 |
| NAA (a.u) | 5.67 | 5.46 | 5.42 | 5.65 | 4.88 | 5.09 | 5.48 | 5.38 ± 0.29 |
|  | 6.45 | .56 | .56 | .67 | .08 | .11 | .42 | 6.41 ± 8.23 |

TABLE 3

SNR values (a.u) before and after SCSA and the corresponding
h values. Spectrum Number and average values.

| Spectrum N (average) | h | before SCSA | after SCSA |
|---|---|---|---|
| 1 (2) | 67.58 | 23.57 | 50.64 |
| 2 (4) | 68.24 | 49.77 | 105.6 |
| 3 (8) | 70.95 | 60.55 | 124.73 |
| 4 (12) | 55.79 | 67.64 | 150.03 |
| 5 (16) | 44.56 | 91.85 | 234.2 |
| 6 (24) | 45.31 | 93.31 | 219.76 |
| 7 (32) | 46.89 | 128.21 | 445.61 |

High Performance Implementation

The SCSA image denoising algorithm described above features two stages of computation, i.e., the image representation and the pixel reconstruction. In the first stage, each column and row of the image is analyzed via extracting the negative eigenvalues and their corresponding eigenvectors. In the second stage, each pixel is reconstructed with a set of BLAS [7] operations that utilize its associated row's and column's eigenvalues and their corresponding eigenvector components. Algorithm 1 shows the SCSA image denoising pseudocode.

---

Algorithm 2 SCSA. 1 is an n × n matrix representing an image.

1: Construct the delta matrix $D_2$
   //Image representation
   {For each row $r_1$ / column $c_1$ of pixels:}
2: for 1 = 0 to n − 1 do
3:    $S_r = -h^2 * D_2 - \text{diag}(r_1)$
4:    Perform eigen analysis of $S_r/S_c$ and extract negative eigenvalues $K_x/K_y$ and corresponding $L^2$-normalized eigenvectors $P_x/P_y$
5: end for
   //Image reconstruction
   {For each pixel $p_{ij}$:}
6: for i = 0 to n − 1 do
7:    for j = 0 to n − 1 do
8:       K = repmat($K_x(i)$,size($K_y(j)$)) + repmat($K_y(j)$,size($K_x(i)$))
9:       v = GEMV(K, $P_y(j, i)$)
10:      $p_{ij}$ = DOT($P_x(i,j)$,v)
11:   end for
12: end for

---

Three incremental high performance implementations for the SCSA image denoising algorithm are presented: 1) a MATLAB implementation, which is used as a performance baseline for subsequent implementations; 2) a C++ sequential implementation that can use the Intel multithreaded Math Kernel Library for performing the matrix computations, i.e., eigen decomposition, matrix-vector, and dot products; and 3) previous implementations with a second level of parallelism based on, e.g., an OpenMP programming model to maximize resource occupancy. The exemplary algorithm can be parallel, where processing of each row and each column of an image is independent and therefore can be performed concurrently using OpenMP constructs. Each thread can run an eigen-decomposition of one pixel row at a time using the LAPACK routine from MKL. Rows of pixels can be distributed among threads in a cyclic manner. An OpenMP barrier can be used to ensure that row computations are done before starting the image reconstruction stage. This later procedure can apply also for the pixel columns. Data management may need to be cautiously handled, for example during the image representation, where generated intermediate data can grow cubically with problem size. The exemplary algorithm can be redesigned to minimize the memory footprint, while enhancing data locality, which can be paramount given the memory-bound nature of the computational kernels. As soon as a given batch of pixel rows and columns have been processed during the image representation, a new algorithm can proceed with image reconstruction for a corresponding batch and reuses the buffers containing the freshly computed negative eigen spectrum. These intermediary buffers can be reinitialized for subsequent batches, saving memory space to ensure algorithmic scalability.

Figure 13A:
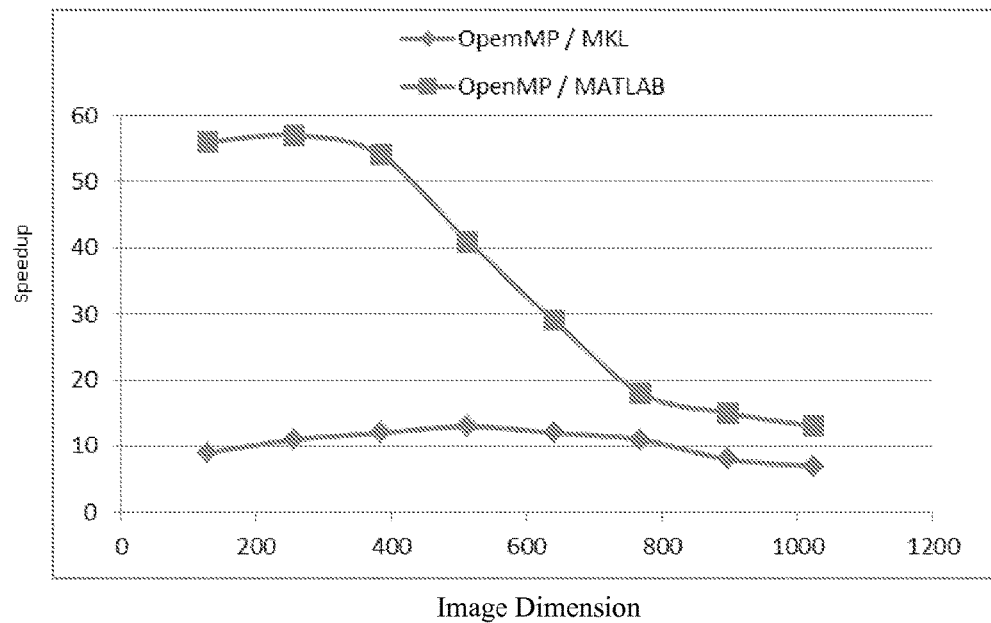
FIG. 13 illustrates SCSA parallel performance.
Figure 13B:
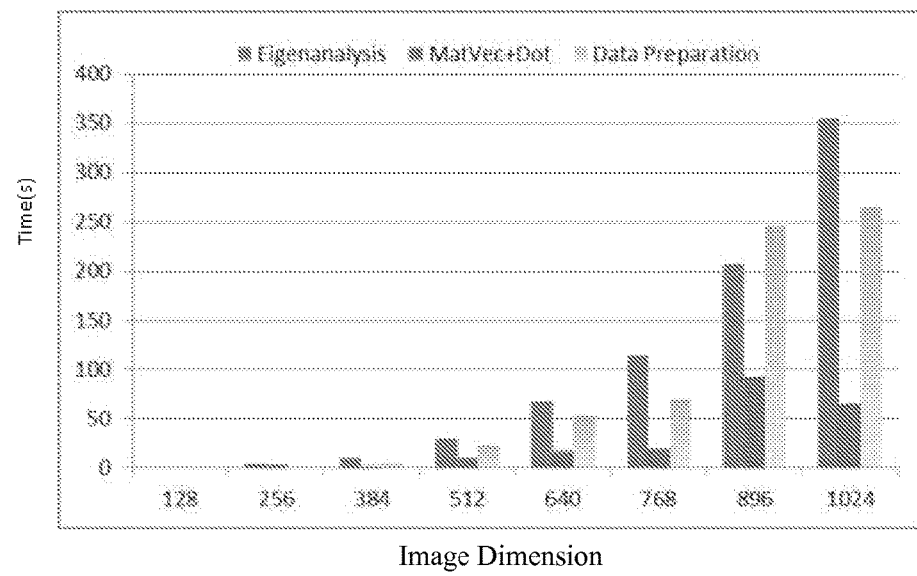

Calculations can be performed in single precision floating-point arithmetic. Implementations can be performed, for example, on a dual socket Intel® Xeon® CPU E5-2680 with ten cores, each running at 2.80 GHz, with a total of 128 GB of main memory. FIG. 13 shows the parallel performance of an OpenMP SCSA image denoising algorithm against an MKL implementation and the MATLAB code and its profiling. In particular, FIG. 13(a) shows the performance speedup of the optimized OpenMP parallel code against MKL as well as against the optimized MATLAB code. Such boost in performance can be attributed to the parallel nature of the algorithm and the ability to take advantage of data locality while fully utilizing the available hardware resources. FIG. 13(b) shows the time breakdown of computational stages. The accelerated implementation peaks in performance for images whose dimensions range up to 512×512 pixels, after which the speedup can begin to decay due to aggressive memory utilization and bus bandwidth saturation. Eigen decomposition can present a bottleneck for large image sizes but can be further optimized using a two-stage eigensolver. A portion of time is spent manipulating data (matrix replication and raising matrix to integer power), as shown in the right-hand bars of FIG. 13(b). This can be alleviated by, e.g., adding dedicated GPU kernels that can simplify this process. To sustain scaling, the algorithm can be extended by, e.g., utilizing a task-based programming model to schedule different kernels among the available processing units. e.g., by using a dynamic runtime system ensuring proper load balancing, data locality and pipelining across computational stages.

REFERENCES

Each of the following references is hereby incorporated by reference in its entirety.

E. Anderson, Z. Bai, C. Bischof, S. Blackford. J. Demmel, J. Dongarra, J. D. Croz, A. Greenbaum, S. Hammarling, A. McKenney, D. Sorensen, LAPACK Users' Guide, 3rd Edition, Society for Industrial and Applied Mathematics, Philadelphia, Pa. USA, 1999.

Basic Linear Algebra Subprograms (BLAS), available at www.netlib.org/blas/.

M. Dimassi and J. Sjöstrand, Spectral asymptotics in the semi-classical limit, Cambridge U Press, 1999.

M. Do, M. Vetterli, The Finite Ridgelet Transform for Image Representation, IEEE Trans. Image Processing 12 (1) (2003) 16-28.

D. E. Dudgeon and G. Lorentz, Constructive approximation, Comprehensive Studies in Mathematics, Springef-Varlag, Volume 303, 1993.

F. Eleiwi, T. M. Laleg-Kirati. S. Khelladi and F. Bakir, A semi-classical signal analysis method for the analysis of turbomachinery flow unsteadiness, Word Academy of Science, Engineering and Technology, Volume 59 (2011), 215-218.

A. Haidar, H. Ltaief, J. Dongarra, Parallel Reduction to Condensed Forms for Symmetric Eigenvalue Problems Using Aggregated Fine-grained and Memory-aware Kernels, in: Proceedings of 2011 International Conference for High Performance Computing, Networking, Storage and Analysis, SC '11, ACM, New York, N.Y., USA, 2011, pp. 8:1-8:11.

B. Helffer, Semi-classical analysis for the Schrödinger operator and application, Lecture notes in mathematics, Springer.

B. Helffer and T. M. Laleg-Kirati, On semi-classical questions related to signal analysis, Asymptotic Analysis Journal, Volume 75, Number 3-4 (2011), 125-144.

B. Helffer and D. Robert, Riesz means of bound states and semiclassical limit connected with a Lieb-Thirring's conjecture 1, Asymptotic Analysis Journal, Volume 3 (1990), 91-103.

Intel Math Kernel Library, available at http://software.intel.com/en-us/intel-mkl.

A. K. Jain, Fundamentals of digital image processing, Prentice-Hall, 1989.

G. E. Karadzhov, Semi-classical asymptotic of spectral function for some Schrödinger operator, Math. Nachr., Volume 128 (1986), 103-114.

Z. Kaisserli, T.-M. Laleg-Kirati, Image Denoising using Squared Eigenfunctions of the Schrödinger Operator, Submitted, Preprint available at http://repository.kaust.edu.sa/kaust/handle/10754/344040.

Z. Kaisserli, T.-M. Laleg-Kirati, A. Lahmar-Benbernou, A Novel Algorithm for Image Representation using Discrete Spectrum of the Schrödinger Operator, Digital Signal Processing 40 (2015) 80-87. doi:http://dx.doi.org/10.1016/j.dsp.2015.01.005.

S. Khelladi, M. Deligant, T M. Laleg Kirati, F. Eleiwi, F. Ravelet and F. Bakir, New indices for the analysis of turbimachinery features by a semi-classical signal analysis method, Submitted.

T. M. Laleg, E. Crepeau, M. Sorine, Semi-Classical Signal Analysis, Mathematics of Control, Signals, and Systems (MCSS) Journal 25 (1) (2013) 37-61.

T. M. Laleg-Kirati, E. Crépeau and M. Sorine, Semi-classical signal analysis, Mathematics of Control, Signals, and Systems (MCSS) Journal, Volume 25, Issue 1 (2013), 37-61.

T. M. Laleg-Kirati, C. Médigue, F. Cottin and M. Sorine, Arterial blood pressure analysis based on scattering transform II, In Proc. EMBC, Sciences and technologies foe health, Lyon, France (2007), 3618-3629.

T. M. Laleg-Kirati, C. Médigue, Y. Papelier, F. Cottin and A. Van de Louw, Validation of a semi-classical Signal analysis method for Stroke volume variation assessment: a comparison with the PiCCO technique, Annals of Biomedical Engineering, Volume 38, Number 12 (2010), 3618-3629.

D. Y. Liu and T. M. Laleg-Kirati, Mathematical properties of a semi-classical signal analysis method: noisy signal case, 1st International Conference on Systems and Computer Science, Villeneuve dascq, France (2012).

S. Mallat, A wavelet tour of signal processing: The sparse way, Third Edition, Elsevier, 2009.

OpenMP Application Program Interface, Version 4.0, available at www.openmp.org/mpdocuments/OpenMP4.0.0.pdf (July 2013).

All of the methods disclosed and claimed herein can be made and executed without undue experimentation in light of the present disclosure. While the apparatus and methods of this invention have been described in terms of preferred embodiments, it will be apparent to those of skill in the art that variations may be applied to the methods and in the steps or in the sequence of steps of the method described herein without departing from the concept, spirit and scope or the invention. In addition, from the foregoing it will be seen that this invention is one well adapted to attain all the ends and objects set forth above, together with other advantages. It will be understood that certain features and subcombinations are of utility and may be employed without reference to other features and sub-combinations. This is contemplated and within the scope of the appended claims. All such similar substitutes and modifications apparent to those skilled in the art are deemed to be within the spirit and scope of the invention as defined by the appended claims.

The invention claimed is:

1. A method of constructing an image from a signal, comprising:

interpreting the signal as a potential of a Schrödinger operator, wherein the signal contains at least a first component associated with a first set of functions and a second component associated with a second set of functions;

decomposing the signal into first squared eigenfunctions associated with the first set of functions from second squared eigenfunctions associated with the second set of functions;

reducing a design parameter of the Schrödinger operator;

reconstructing and analyzing the signal with, in part, semi-classical analysis, which includes, analyzing a first discrete spectrum of the Schrödinger operator for the first set of functions and a second discrete spectrum of the Schrödinger operator for the second set of functions; and combining the analysis of the first and second discrete spectra to construct the image, wherein the image is generated with a processor as a magnetic resonance image or as a tomographic image.

2. The method of claim 1, wherein the signal is a video signal.

3. A method for denoising a noisy image, comprising:

associating the noisy image with a potential $V_2$ of a semi-classical Schrödinger operator $H_{2,h}$, wherein h is a semi-classical parameter;

decomposing the semi-classical Schrödinger operator $H_h$ into one-dimensional decoupled operators $A_{i,h}$ and $B_{j,h}$, where i and j refer to an $i^{th}$ row and $j^{th}$ column of the semi-classical Schrödinger operator $H_h$, and decomposing data containing the noisy image into first and second squared eigenfunctions based on the one-dimensional decoupled operators $A_{i,h}$ and $B_{j,h}$;

estimating a discrete spectra of the first and second squared eigenfunctions using the one-dimensional decoupled operators $A_{i,h}$ and $B_{j,h}$ and the semi-classical parameter h;

constructing a denoised image, which is an approximation of the noisy image, based on the estimated discrete spectra;

checking a stopping criterion for the denoised image; and updating a value of the semi-classical parameter h and then repeating the estimating, constructing and checking steps to construct a new denoised image, wherein the new denoised image is generated with a processor as a magnetic resonance image or as a tomographic image.

4. The method of claim 3, wherein analyzing the discrete spectra excludes noise in the data.

5. The method of claim 3, wherein the squared eigenfunctions are adaptive and the analyzing includes a morphological analysis.

6. A system for denoising a signal, comprising:
a computer processor; and
a non-transitory computer readable medium containing instructions directing the system to execute steps comprising:
interpreting the signal as a potential of a Schrödinger operator, wherein the signal contains at least a first component associated with a first set of functions and a second component associated with a second set of functions;
decomposing the signal into first squared eigenfunctions associated with the first set of functions from second squared eigenfunctions associated with the second set of functions;
reducing a design parameter of the Schrödinger operator;
reconstructing and analyzing the signal with, in part, semi-classical analysis, which includes,
analyzing a first discrete spectrum of the Schrödinger operator for the first set of functions and a second discrete spectrum of the Schrödinger operator for the second set of functions; and
combining the analysis of the first and second discrete spectra to reconstruct a denoised signal,
wherein the denoised signal is used to generate a magnetic resonance image or a tomographic image.

7. The system of claim 6, wherein the signal contains information of a two-dimensional image.

* * * * *